US011283879B2

(12) United States Patent
Chandaria

(10) Patent No.: US 11,283,879 B2
(45) Date of Patent: Mar. 22, 2022

(54) SYSTEM, APPARATUS AND METHOD FOR PROVIDING END TO END SOLUTION FOR NETWORKS

(71) Applicant: Ciambella Ltd., Tortola (VG)

(72) Inventor: Trisala Chandaria, New York, NY (US)

(73) Assignee: Ciambella Ltd., Tortola (VG)

( * ) Notice: Subject to any disclaimer, the term of this patent is extended or adjusted under 35 U.S.C. 154(b) by 87 days.

(21) Appl. No.: 16/595,613

(22) Filed: Oct. 8, 2019

(65) Prior Publication Data

US 2020/0112612 A1   Apr. 9, 2020

Related U.S. Application Data

(60) Provisional application No. 62/742,798, filed on Oct. 8, 2018, provisional application No. 62/742,898, filed on Oct. 8, 2018.

(51) Int. Cl.
*H04L 29/08* (2006.01)
*H04L 29/06* (2006.01)
(Continued)

(52) U.S. Cl.
CPC ........ *H04L 67/141* (2013.01); *H04L 41/0806* (2013.01); *H04L 67/16* (2013.01);
(Continued)

(58) Field of Classification Search
CPC .... H04L 67/141; H04L 41/0806; H04L 67/34
(Continued)

(56) References Cited

U.S. PATENT DOCUMENTS 9,893,940 B1\* 2/2018 Chawla ............... H04L 41/0816
2005/0210525 A1\* 9/2005 Carle ............... H04N 21/25833
725/105
(Continued)

FOREIGN PATENT DOCUMENTS

WO WO-2014/041623 A1 3/2014
WO WO-2017/027632 A1 2/2017

OTHER PUBLICATIONS

Cano Julio et al.: "Coordination of ECA Rules by Verification and Control", Jun. 3, 2014, International Conference on Computer Analysis of Images and Patterns, CAIP 2017. [Lecture Notes in Computer Science], Springer, Berlin, Heidelberg, pp. 33-48.
(Continued)

*Primary Examiner* — Kevin T Bates
*Assistant Examiner* — Chen-Liang Huang
(74) *Attorney, Agent, or Firm* — Moser Taboada

(57) ABSTRACT

A method, apparatus and system for assisted code provisioning of an end to end network includes automatically providing a first interface menu for enabling an initial user input of at least one of configuration information and application logic information for devices of the end to end network and continuing to automatically provide subsequent interface menus for receiving configuration information and application logic information for all devices and interconnections required to establish the end to end network in which a subsequent interface menu provided for input can be dependent upon an input made to a previously provided interface menu, and an order of interface menus automatically provided guides a user through a provisioning of the end to end network without the need to enter programming code. Programming code can be automatically generated from the input information and deployed for each of the devices required to establish the end to end network.

28 Claims, 28 Drawing Sheets

(51) Int. Cl.
  *H04L 12/24* (2006.01)
  *H04L 67/141* (2022.01)
  *H04L 67/51* (2022.01)
  *H04L 67/133* (2022.01)
  *H04L 67/01* (2022.01)
  *H04L 41/0806* (2022.01)
  *H04L 67/00* (2022.01)
  *H04L 67/50* (2022.01)

(52) U.S. Cl.
  CPC ............. *H04L 67/22* (2013.01); *H04L 67/34* (2013.01); *H04L 67/40* (2013.01); *H04L 67/42* (2013.01)

(58) Field of Classification Search
  USPC ........................................................ 709/223
  See application file for complete search history.

(56) References Cited

U.S. PATENT DOCUMENTS

| | | | |
|---|---|---|---|
| 2009/0307105 | A1 | 12/2009 | Lemay et al. |
| 2010/0131978 | A1* | 5/2010 | Friedlander ......... H04L 12/2812 725/37 |
| 2010/0180106 | A1* | 7/2010 | Grinshpun .......... G06F 11/1438 712/228 |
| 2010/0280841 | A1* | 11/2010 | Dong ................... A61B 5/7475 705/2 |
| 2014/0101581 | A1 | 4/2014 | Lan et al. |
| 2014/0344359 | A1* | 11/2014 | Broz ....................... H04L 51/32 709/204 |
| 2015/0112764 | A1* | 4/2015 | Augustine .......... G06Q 30/0202 705/7.31 |
| 2016/0092064 | A1 | 3/2016 | Wu |
| 2016/0287989 | A1* | 10/2016 | Fung .................... A63F 13/816 |
| 2018/0039558 | A1* | 2/2018 | Shiraishi ............ G06F 11/3476 |
| 2020/0387129 | A1* | 12/2020 | Chandaria ............ G05B 19/058 |

OTHER PUBLICATIONS

Partial Supplementary European Search Report for application No. EP 16880005, dated Oct. 21, 2019.

PCT International Search Report and Written Opinion on application No. PCT/US2019/055109 dated Jan. 22, 2020.

* cited by examiner

GENERATE APPLICATION

① GET STARTED    320
② GATEWAY
③ SENSORS & ACTUATORS
④ POWER
⑤ RULES & NOTIFICATIONS
⑥ DATA & PREDICTIONS
⑦ SCALING
⑧ GENERATE CODE
⑨ DEPLOY & USE
⑩ SHARE

SET UP YOUR GATEWAY

GATEWAY HARDWARE
WHAT TYPE OF GATEWAY ARE YOU USING? ▼
  GATEWAY MODEL A      WIFI & ETHERNET ✓
  IOT GATEWAY MODEL B  WIFI & ETHERNET
  ☐ OTHER GATEWAY DEVICE  WIFI & ETHERNET

GATEWAY OS
LINUX ▼

GATEWAY LOCATION
WHERE WILL YOUR GATEWAY BE LOCATED?
USE LAT/LONG

GATEWAY NAME
GIVE YOUR GATEWAY A NAME

NEXT >

GENERATE APPLICATION

1. GET STARTED
2. GATEWAY
3. SENSORS & ACTUATORS (1)
4. POWER
5. RULES & NOTIFICATIONS
6. DATA & PREDICTIONS
7. SCALING
8. GENERATE CODE
9. DEPLOY & USE
10. SHARE

POWER SETTINGS

HOW ARE YOUR EDGES AND GATEWAYS POWERED?

GATEWAY POWER

MYGATEWAYNAME
<--> RASPBERRY PI LINUX   WIRED POWER ▶

EDGE POWER  511

☐ ALL EDGES POWERED BY   WIRED POWER ▶
513

MYEDGEDEVICE1 (17)
((· TICC3200S   WIRED POWER ▶

MYEDGEWITHLONGERNAME2
((· TICC3200S   WIRED POWER ▶

MYOTHEREDGE3
((· TICC3200S   WIRED POWER ▶
512

NEXT >

| GENERATE APPLICATION | |
|---|---|
| ① GET STARTED | 6 DATA & PREDICTION PREFERENCES |
| ② GATEWAY (1) | |
| ③ SENSORS & ACTUATORS (3) | SENSOR DATA FREQUENCY |
| ④ POWER | HOW OFTEN SHOULD GATEWAYS SEND SENSOR DATA? |
| ⑤ RULES & NOTIFICATIONS (4) | EVERY 30 MINUTES CHANGE |
| ⑥ DATA & PREDICTIONS | HOW OFTEN SHOULD EDGES SEND SENSOR DATA TO GATEWAYS? |
| ⑦ SCALING | EVERY 20 SECONDS CHANGE |
| ⑧ GENERATE CODE | |
| ⑨ DEPLOY & USE | |
| ⑩ SHARE | |

SENSOR PREDICTION
MACHINE-LEARNING DRIVEN INSIGHTS INTO BEHAVIOR OF SENSORS & ACTUATORS
ANOMALY DETECTION ⚪
GET AUTOMATIC EMAIL OR SMS NOTIFICATIONS WHEN ABNORMAL EVENTS IN DATA
RULE TRIGGER PREDICTION ⚪
AUTOMATICALLY NOTIFY WHEN PREDICTS THAT SENSOR HEALTH RULES WILL TRIGGER

DATA INSIGHTS

SYSTEM OPTIMIZATION
WHAT ASPECTS OF SYSTEM ARE TO OPTIMIZE FOR?
☐ MINIMIZE MACHINE DOWNTIME
☐ INCREASE PROCESS OUTPUT
☐ REDUCE RESOURCE CONSUMPTION

EXTERNAL DATA SOURCES
AUGMENT SENSOR DATA WITH ADDITIONAL DATA SETS.
WHICH INFORMATION SOURCES ARE MOST RELEVANT TO APPLICATION.
☐ WEATHER DATA, E.G., THE YAHOO WEATHER API
☐ FINANCIAL DATA E.G., STOCK DATA
☐ CUSTOMER SUPPORT DATA E.G., TICKETS FROM COMPANY'S ACCOUNT
☐ BUSINESS METRICS E.G., CUSTOMER RETENTION FIGURES
☐ INFRASTRUCTURE METRICS E.G., SERVER UPTIME
☐ api ANY INTERNAL DATABASE OR API DATA

DATA FOR PUBLIC GOOD

GENERATING DATA ON AIR, WATER, OR SOIL QUALITY?
OPEN TO SHARING THIS DATA TO ADVANCE THE PUBLIC GOOD?
CHECK THE BOX BELOW AND WE'll BE IN TOUCH.
☐
I'M INTERESTED IN SHARING SENSOR DATA

SENDING DATA TO THIRD-PARTY CLOUDS?   [ NEXT > ]

SYSTEM, APPARATUS AND METHOD FOR PROVIDING END TO END SOLUTION FOR NETWORKS

CROSS-REFERENCE TO RELATED APPLICATIONS

This application claims priority to and the benefit of U.S. Provisional Patent Application Ser. No. 62/742,798, filed Oct. 8, 2018 and U.S. Provisional Patent Application Ser. No. 62/742,898, filed Oct. 8, 2018, which are incorporated herein by this reference in their entireties.

BACKGROUND

Field

Embodiments described herein generally relate to a method, apparatus and system for providing end to end solution for devices of an end to end network, and more specfically, for assisting the provisioning of end to end systems and enabling the ability to automatically generate end to end code, for example, for a complete Internet of Things (IoT) system supporting multiple architecture options, connectivity options, scaling, provisions and over the air update capabilities.

Description of the Related Art

While programming for devices and systems, programmers add one or more functionalities to a program. Different target devices may have different system requirements for supporting implementation of a function. Even a user expert in one programming language, or in programming for one type of target device may find it challenging to create fully functional and optimized programs in a variety of programming languages, and/or for a variety of target devices.

Further, programming for target devices such as programmable logic controllers (PLCs), field programmable gate arrays (FPGAs) and other controller-based devices (e.g. microcontroller or microprocessor based devices), for example memory controller unit (MCU) and system on a chip (SoC) is even more complex, given the wide variety of device types, varied system requirements, configurations, applications, and programming languages used. To add to the complexity, such devices are deployed in remote locations, and usually adjunct to conventional systems, making programming for such target devices for adding functionalities very challenging for an average user.

Thus, there is a need in the art for simplifying configuration and programming of end to end systems without the need for a user to generate code for various types of end to end systems, while supporting multiple architecture options, connectivity options, scaling provisions and update capabilities.

SUMMARY

Embodiments described herein generally relate to a method, apparatus and system for providing end to end solutions for devices of an end to end system, and more specfically, for assisting the provisioning of end to end systems and enabling the ability to automatically generate end to end code, for example, for a complete Internet of Things (IoT) system supporting multiple architecture options, connectivity options, scaling provisions and update capabilities, substantially as shown in and/or described in connection with at least one of the figures, as set forth more completely in the claims.

In some embodiments, a method for assisted code provisioning of an end to end network includes automatically providing a first interface menu for enabling an initial user input of at least one of configuration information and application logic information for devices of the end to end network, in response to the initial user input of the at least one of the configuration information and application logic information for at least one of the devices of the end to end network, automatically providing a second interface menu for enabling a subsequent user input of at least one of configuration information and application logic information for at least one other one of the devices of the end to end network, and continuing to automatically provide subsequent interface menus for receiving at least one of configuration information and application logic information for all devices and interconnections required to establish the end to end network. In such embodiments, a subsequent interface menu provided for input can be dependent upon an input made to a previously provided interface menu and an order of interface menus automatically provided guides a user through a provisioning of the end to end network without the need to enter programming code.

In some embodiments the method can further include at least one of automatically generating programming code from the input configuration information and application logic information for each of the devices required to establish the end to end network and deploying the generated programming code by sending the generated programming code to respective ones of each of the devices for configuring the devices to establish the end to end network.

In some embodiments the method can further include at least one of analyzing operating data of at least one of the devices of the end to end network and predicting a future behavior of the at least one of the devices of the end to end network using the analyzed data, at least one of monitoring and analyzing operating data of the devices of the end to end network and reprogramming at least one of the devices of the end to end network based on the at least one of the monitored and analyzed data, and providing a scaling function such that the at least one of the configuration information and application logic information does not have to be input for duplicate ones of the at least one of the devices of the end to end network. In some embodiments the method can further include determining at least one of the configuration information and application logic information using at least one of machine learning, linear regression analysis and neural networks.

In some embodiments, a method for assisted code provisioning of an end to end network includes receiving at least one of configuration information and application logic information for devices required to establish the end to end network automatically generating programming code from the received configuration information for each of the devices required to establish the end to end network, and deploying the generated programming code by sending/communicating the generated programming code to respective ones of each of the devices for configuring the devices to establish the end to end network.

In some embodiments the method further includes providing an interface to a user for inputting the configuration information and application logic information for each of the devices required to establish the end to end network.

In some embodiments, an apparatus for assisted code provisioning of an end to end network includes an onboarding module configured to automatically provide a first interface menu for enabling an initial user input of at least one of configuration information and application logic information for devices of the end to end network, in response to the initial user input of the at least one of the configuration information and application logic information for at least one of the devices of the end to end network, automatically provide a second interface menu for enabling a subsequent user input of at least one of configuration information and application logic information for at least one other one of the devices of the end to end network, and continue to automatically provide subsequent interface menus for receiving at least one of configuration information and application logic information for all devices and interconnections required to establish the end to end network. In some embodiments the apparatus can further include a code generator module to automatically generate programming code from the received at least one of the configuration information and application logic information for each of the devices required to establish the end to end network. In such embodiments, a subsequent interface menu provided for input can be dependent upon an input made to a previously provided interface menu and an order of interface menus automatically provided guides a user through a provisioning of the end to end network without the need to enter programming code.

In some embodiments, the apparatus can further include a deployment module to deploy the generated programming code by sending the generated programming code to respective ones of each of the devices for configuring the devices to establish the end to end network.

In some embodiments the apparatus can further be configured to at least one analyze operating data of at least one of the devices of the end to end network and predict a future behavior of the at least one of the devices of the end to end network using the analyzed data, at least one of monitor and analyze operating data of the devices of the end to end network and reprogram at least one of the devices of the end to end network based on the at least one of the monitored and analyzed data, provide a scaling function such that the at least one of the configuration information and application logic information does not have to be input for duplicate ones of the at least one of the devices of the end to end network and generate a graphical user interface for enabling a user to input the configuration information and the application logic information for the devices required to establish the end to end network.

In some embodiments of the apparatus, the end to end network can comprise an internet-of-things (IoT) end to end network and at least some of the devices comprise IoT devices. In some embodiments of the apparatus, the devices of the end to end network can comprise multiple architecture options, connectivity options, scaling options and programming languages and the code generator module generates respective code for each of the devices in accordance with how each of the devices is provisioned.

In some embodiments, a non-transitory machine-readable medium has stored thereon at least one program, the at least one program including instructions which, when executed by a processor, cause the processor to perform a method in a processor based system for assisted code provisioning of an end to end network, including automatically providing a first interface menu for enabling an initial user input of at least one of configuration information and application logic information for devices of the end to end network, in response to the initial user input of the at least one of the configuration information and application logic information for at least one of the devices of the end to end network, automatically providing a second interface menu for enabling a subsequent user input of at least one of configuration information and application logic information for at least one other one of the devices of the end to end network, and continuing to automatically provide subsequent interface menus for receiving at least one of configuration information and application logic information for all devices and interconnections required to establish the end to end network. In such embodiments, a subsequent interface menu provided for input can be dependent upon an input made to a previously provided interface menu and an order of interface menus automatically provided guides a user through a provisioning of the end to end network without the need to enter programming code.

In some embodiments the method performed by the processor when executing the program can further include at least one of automatically generating programming code from the input configuration information and application logic information for each of the devices required to establish the end to end network and deploying the generated programming code by sending the generated programming code to respective ones of each of the devices for configuring the devices to establish the end to end network.

In some embodiments the method performed by the processor when executing the program can further include at least one of analyzing operating data of at least one of the devices of the end to end network and predicting a future behavior of the at least one of the devices of the end to end network using the analyzed data, at least one of monitoring and analyzing operating data of the devices of the end to end network and reprogramming at least one of the devices of the end to end network based on the at least one of the monitored and analyzed data, and providing a scaling function such that the at least one of the configuration information and application logic information does not have to be input for duplicate ones of the at least one of the devices of the end to end network. In some embodiments the method can further include determining at least one of the configuration information and application logic information using at least one of machine learning, linear regression analysis and neural networks.

In some embodiments, a non-transitory machine-readable medium has stored thereon at least one program, the at least one program including instructions which, when executed by a processor, cause the processor to perform a method in a processor based system for assisted code provisioning of an end to end network, including receiving at least one of configuration information and application logic information for devices required to establish the end to end network, automatically generating programming code from the received configuration information and application logic information for each of the devices required to establish the end to end network, and deploying the generated programming code by sending/communicating the generated programming code to respective ones of each of the devices for configuring the devices to establish the end to end network.

In some embodiments, the method performed by the processor when executing the program further includes providing an interface to a user for inputting the configuration information and application logic information for each of the devices required to establish the end to end network.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 3 depicts a graphical representation of a third onboarding menu in accordance with an embodiment of the present principles.

FIG. 5 depicts a graphical representation of a sixth onboarding menu in accordance with an embodiment of the present principles.

FIG. 6B depicts a graphical representation of a second portion of an optional seventh onboarding menu in accordance with an embodiment of the present principles.

FIG. 9 depicts a graphical representation of an optional ninth onboarding menu in accordance with an embodiment of the present principles.

Figure 1:
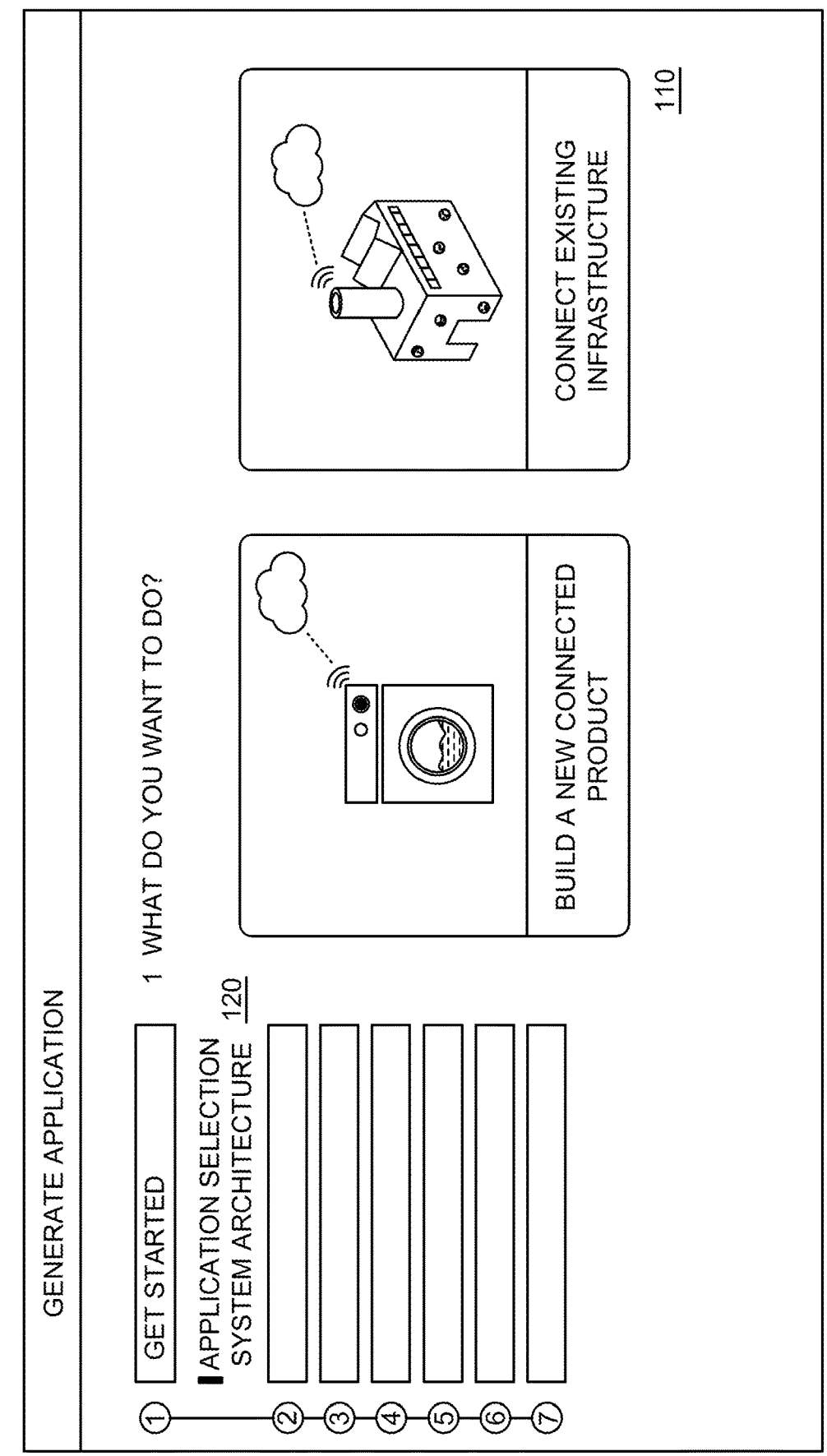
FIG. 1 depicts a graphical representation of a first onboarding menu of an ACGUI in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Some embodiments described herein relate to a method, apparatus and system for assisted provisioning of an end to end network, such as an IoT end to end network. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to particular network environments and the application of particular programming/coding languages and algorithms, such teachings should not be considered limiting. Embodiments in accordance with the present principles can be implemented in substantially any network environment using other programming/coding languages and algorithms in accordance with the present principles.

In some embodiments in accordance with the present principles, a graphical user interface is provided to enable a user to setup device configurations and application parameters. In some embodiments, the graphical interface enables a user to select and configure at least a device (sensors, actuators, MCUs, PLCs, SoCs, FPGAs and the like) from which a remote process will be called for execution and to assign the defined conditions (on streaming and remote process calls management) to particular I/O (inputs/outputs) of a device electronics (MCU, SoC, etc.). In some embodiments, the graphical user interface enables a user to define relationships between remote devices (edge device/gateway/independent device) and how data is to be transported between devices (transfer protocol selection) and to define behavioral constraints for the devices of the selected processes or applications. In some embodiments, the graphical user interface enables the ability to generate application code including remote process calls and conditions for execution and data management in any given programming language, for each device and to enable a user to easily manage and re-program any device on which code and/or applications have been deployed.

For example, in some embodiments, while configuring/implementing a new device or a network or a system, a user can access an automatic code generation user interface (ACGUI) on a user device, for example such as a server/computer or mobile device. The ACGUI enables a user, through a number of different setup and onboarding screens, to create desired applications for devices/system being configured/implemented.

In some embodiment, the user selects a desired function in the ACGUI, specifies operating parameters, such as configuration parameters and application logic parameters, and provides other inputs as may be required for the automatic generation of code for the desired function. Based on the provided inputs, code is automatically generated corresponding to the desired function. The automatically generated code is then injected or otherwise incorporated into the automatically generated program being created. As used herein, the terms "inject" or "incorporate" are used interchangeably in the context of code being injected or incorporated in a program being developed. An automatically generated program refers to appropriately importing the code into the program, such that the program including the automatically generated code may be executed without additional modifications. The program comprising the automatically generated code, also referred to as automatically generated program (AGP) is then sent to the target device for installation and execution.

Parameters and other inputs include information for operation of the automatically generated code on the target device such as target device type, power requirements, network equipment configuration, network details, authentication details for additional services or devices if required for execution of the desired function, among several other parameters and inputs.

Commonly assigned U.S. Pat. No. 8,726,285, filed 28 Jan. 2011; U.S. Pat. No. 9,436,439, filed 17 Jun. 2014; U.S. Pat. No. 9,239,705, filed 17 Jun. 2014; U.S. Pat. No. 9,235,383, filed 17 Jun. 2014; and U.S. Patent Application Publication Numbers 2009/0070121, filed 11 Sep. 2007; 2009/0070162, filed 11 Sep. 2007; 2015/0199088, filed 9 Jan. 2015; 2015/0286362, filed 13 Apr. 2015; 2016/0327925, filed 8 Mar. 2016; 2016/0328216, filed 6 May 2016; U.S. application Ser. No. 15/163,280, filed May 24, 2016; Ser. No. 15/386,180, filed Dec. 21, 2016; and 62/471,071 filed Mar. 14, 2017, each of which is incorporated herein by reference in their entireties, describe techniques for developing software for a device incorporating a controller, and executing, managing, reprogramming or changing the behavior of the software, e.g. remotely, to extend the capabilities of such a device via defined workflows.

FIG. 1 depicts a graphical representation of a first onboarding menu 110 of an ACGUI 100 in accordance with an embodiment of the present principles. Although in the following description of embodiments of the present principles, various menus of the ACGUI 100 will be depicted as being presented in a certain order, the menus of an ACGUI of the present principles can be presented to a user in substantially any order unless the information in one menu is a pre-requisite for information in another menu.

In some embodiments of the ACGUI 100 of FIG. 1, the first onboarding menu 110 can have an "accordian" style, where sections can expand and collapse. In addition or alternatively, the menu 110 can comprise other styles, such as wireframes, for accessing portions of the menu 110. What is important is that the menus enable a user to select or input at least programming information and/or application logic information for devices of a system, such as an IoT end to end system, to be provisioned. In addition, in some embodiments of an ACGUI in accordance with the present principles, such as the ACGUI 100 of FIG. 1, only one section can be opened at a time, and clicking on a closed section automatically closes the currently open section, and opens the selected section.

In the embodiment of the ACGUI 100 of FIG. 1, the onboarding flow will be presented sequentially such that a user is guided to complete the flow in a determined sequence and specifically, in the onboarding flow, a step 2 will not be enabled until a step 1 is complete, and so on. In some embodiments, the onboarding flow order in accordance with the present principles can comprise a different order than what will be described with respect to the ACGUI 100 of FIG. 1.

The first onboarding menu 110 of the ACGUI 100 of FIG. 1 illustratively comprises a binary choice about the type of product that is to be constructed/configured. More specifically, the depicted embodiment of the menu 110 of the ACGUI 100 of FIG. 1 enables a user to select between building a new connected product, for example a connected air conditioner, or configuring an existing industrial infrastructure, such as sensors connected to actuators and/or controllers. In some embodiments, a user's selections/inputs in some menus can influences the onboarding flow and what future menus will be presented to the user. As depicted in the embodiment of the first onboarding menu 110 of the ACGUI 100 of FIG. 1, in some embodiments, menus of an ACGUI in accordance with the present principles can further include a navigation menu area 120, illustratively on the left side of the first onboarding menu 110, which can inform a user at what point the user is in the navigation process of configuring/implementing a new device/system in a network in accordance with the present principles.

Figure 2:
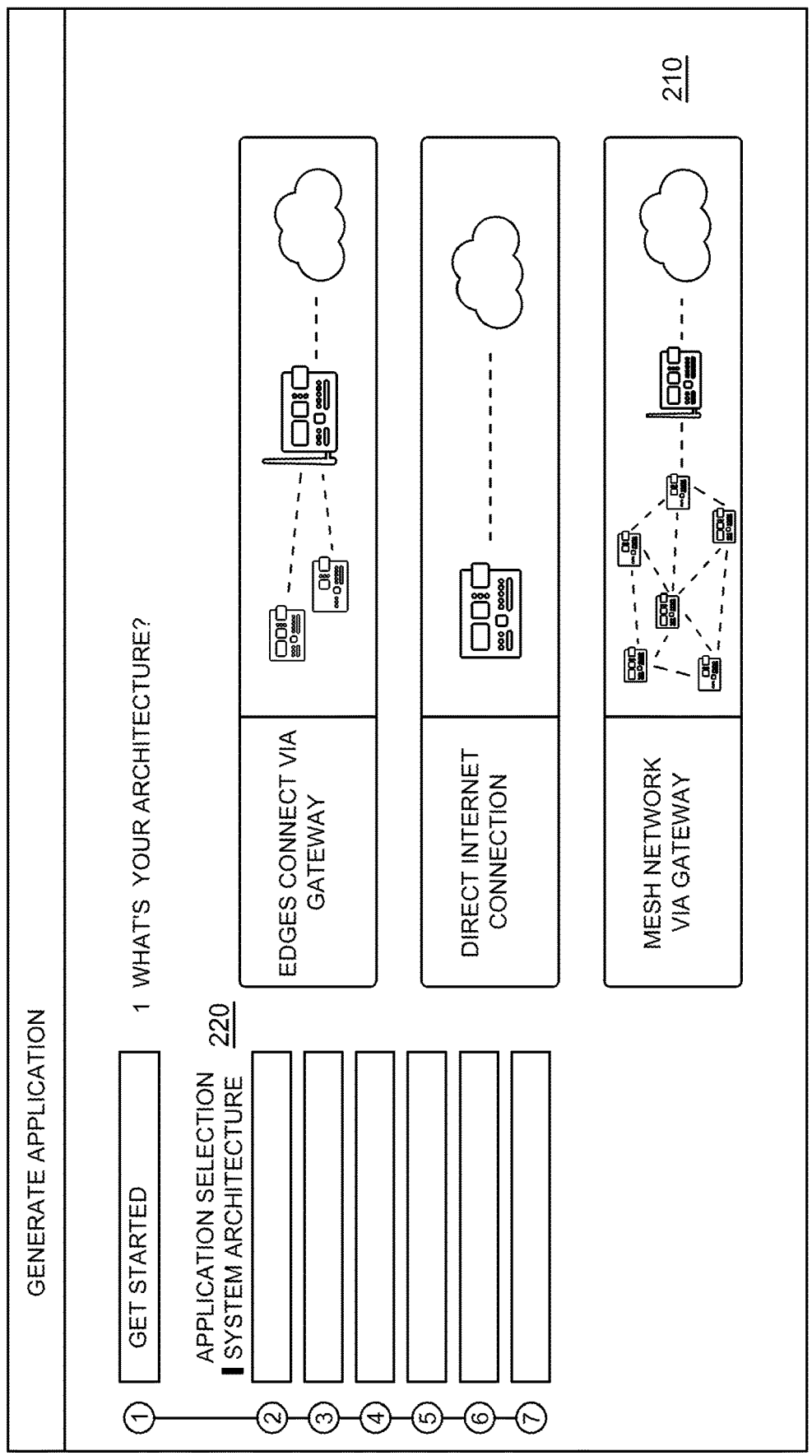
FIG. 2 depicts a graphical representation of a second onboarding menu in accordance with an embodiment of the present principles.

FIG. 2 depicts a graphical representation of a second onboarding menu 210 in accordance with an embodiment of the present principles. The second onboarding menu 210 of FIG. 2 enables a user to identify/select the architecture of the system. In the embodiment of the second onboarding menu 210 of FIG. 2, choices include:
  a. Edges connected via gateway
  b. Edges connected directly via an internet
  c. Mesh network connecting via gateway The choice of architecture is a choice that both helps orient the user and influences the onboarding flow and what future menus will be presented to the user. Although the second onboarding menu 210 depicted in FIG. 2 depicts specific choices that can be made by a user, in some embodiments in accordance with the present principles, a second onboarding menu is not so limited and can include other choices that can be selected by a user.

The following description assumes a selection of the "edge-to-gateway" flow as the architecture, however, the gateway step (and all subsequent references to the gateway) would be removed in the event that a user selected an "edge-to-cloud" architecture. In addition, a selection of the "mesh network connecting via gateway" would present following menus with additional mesh-specific configuration settings.

In the embodiment of the second onboarding menu 210 of FIG. 2, since the architecture choice influences the remainder of the onboarding flow, the subsequent steps in the flow in the navigation menu 220 on the left side of the second onboarding menu 210 are obscured. In some embodiments, a listing of subsequent steps are revealed in the navigation menu 220 once the architecture choice has been made.

FIG. 3 depicts a graphical representation of a third onboarding menu 310 in accordance with an embodiment of the present principles. The third onboarding menu 310 of the embodiment of FIG. 3 enables a user to upload information required to configure and generate the gateway application. In the onboarding menu 310 of the embodiment of FIG. 3, gateway choices are presented in terms of both specific hardware devices and operating systems, so that users can pick the option that matches the user's requirements. Exemplary Gateway choices depicted in the onboarding menu 310 of the embodiment of FIG. 3 include, but are not limited to:
  Raspberry Pi 3 Model B
  Dell Edge IoT Gateway
  Beaglebone Black
In addition, exemplary operating system (OS) choices can include, but are not limited to:
  Linux
  Windows In some embodiments, the onboarding menu 310 of FIG. 3 can also include a call to action to obtaining assistance if a user is unable to find a matching selection in the list of supported gateway types. In some embodiments, selecting this option will make a contact form available to the user. In the embodiment of the onboarding menu 310 of FIG. 3, the remainder of the gateway menu captures information including but not limited to:
  How the gateway is connected to the internet
    This selection can be auto-filled based on the hardware choice. For example, if ethernet is only supported on the Raspberry Pi, then ethernet can be selected by default and not necessarily editable.
  The gateway OS type
    This selection can be auto-populated based on either the user's selection of an OS, or the user's choice of hardware. For example, if Raspberry Pi is chosen, a selection of "Windows" or "OS X" as the operating system may not be permitted.
  The gateway location
  The gateway name.

As depicted in the third onboarding menu 310 of FIG. 3, in some embodiments an onboarding menu for selecting and provisioning a gateway in accordance with the present principles can include a link to a gateway setup guide. In some embodiments of the third onboarding menu 310 of FIG. 3, a "Next" button can be disabled until all form states have been populated and error states can be identified in the offending form field. In the third onboarding menu 310 of FIG. 3, the flow in the navigation menu 320 on the left side of the third onboarding menu 310 illustratively indicates that a user is currently performing a Gateway configuration process.

Figure 4A:
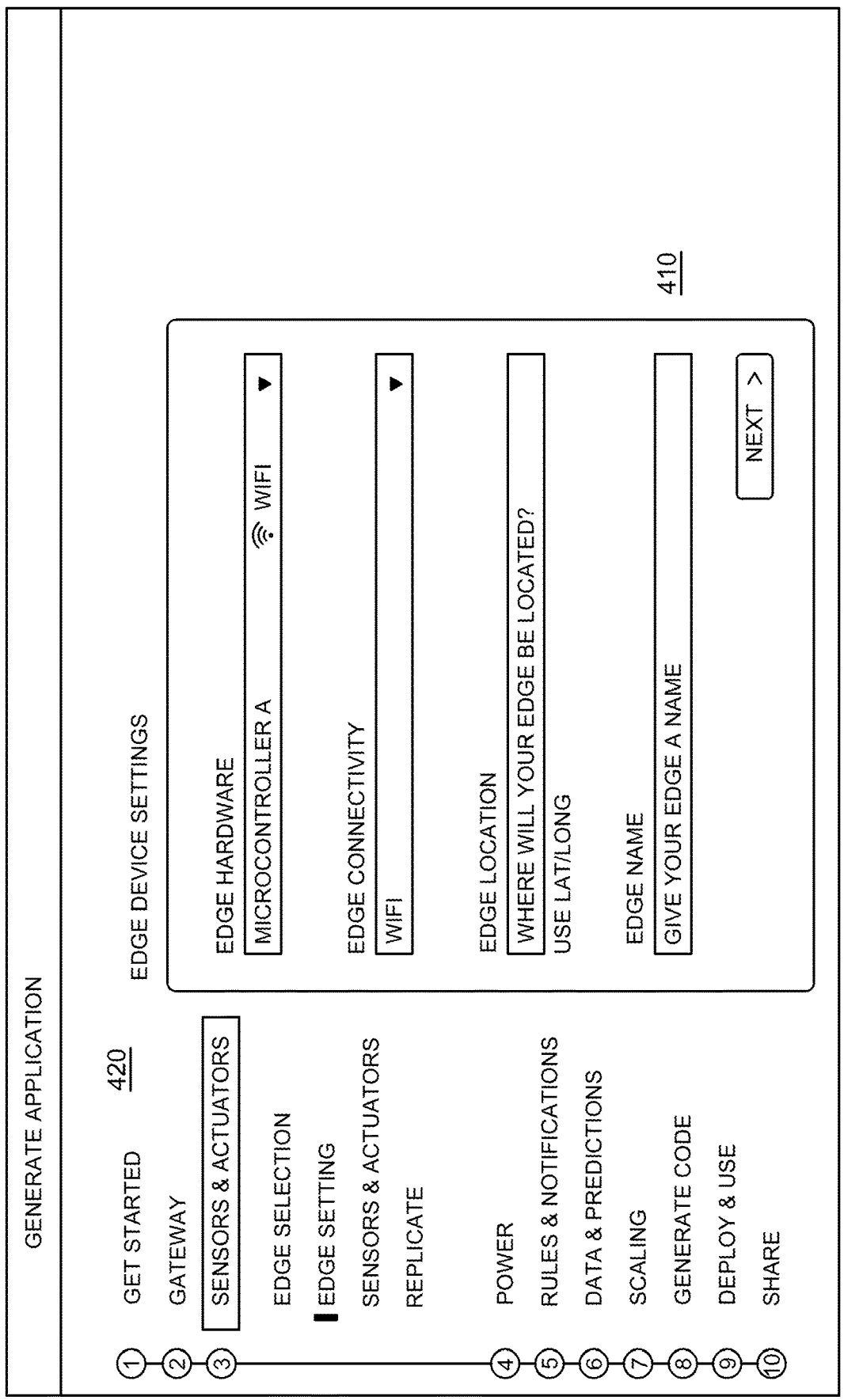
FIG. 4A depicts a graphical representation of a fourth onboarding menu in accordance with an embodiment of the present principles.

FIG. 4A depicts a graphical representation of a fourth onboarding menu 410 in accordance with an embodiment of the present principles. The fourth onboarding menu 410 of the embodiment of FIG. 4A enables a user to upload information required to configure and generate edge devices. In some embodiments an edge setup section can be more involved than the gateway setup section, and so an edge setup section can be split up into logical, digestible pieces. In some embodiments, at least one edge device must be set up to proceed with the remainder of the onboarding flow.

As depicted in the fourth onboarding menu 410 of FIG. 4A, in some embodiments a user can be prompted to select an edge device to configure by visually presenting a menu of edge types to the user. In some embodiments, the options options presented to a user can take the form of both edge manufacturers and general types of supported edge devices, such as Modbus edges.

In the fourth onboarding menu 410 of FIG. 4A, each selection of an edge device activates a following section which enables a user to make hardware selections for the edge device. In the embodiment of the fourth onboarding menu 410 depicted in FIG. 4A, the edge settings screen captures the following information on a per-edge basis:
  The type of edge device being used
  How that edge connects to the gateway
  Where the edge is located
  The name of the edge device The selections available in the fourth onboarding menu 410 for the edge device type selector are influenced by the choices made in the previous step. For example, if a user selects TI hardware, then the only selections that will be available to a user for edge hardware will include TI hardware. If a user selects WiFi, then the only selections that will be available to a user for edge hardware will include devices that support connections via WiFi. Once a specific edge device type has been selected and given a location and name, a user is enabled to set up sensors and actuators on the device. In several embodiments, edge devices must have at least one sensor or one actuator associated with the edge device. Although the fourth onboarding menu 410 depicted in FIG. 4A depicts specific information that can be captured on a per-edge basis, in some embodiments in accordance with the present principles, a fourth onboarding menu is not so limited and can include the capture of other information on a per-edge basis.

Figure 4B:
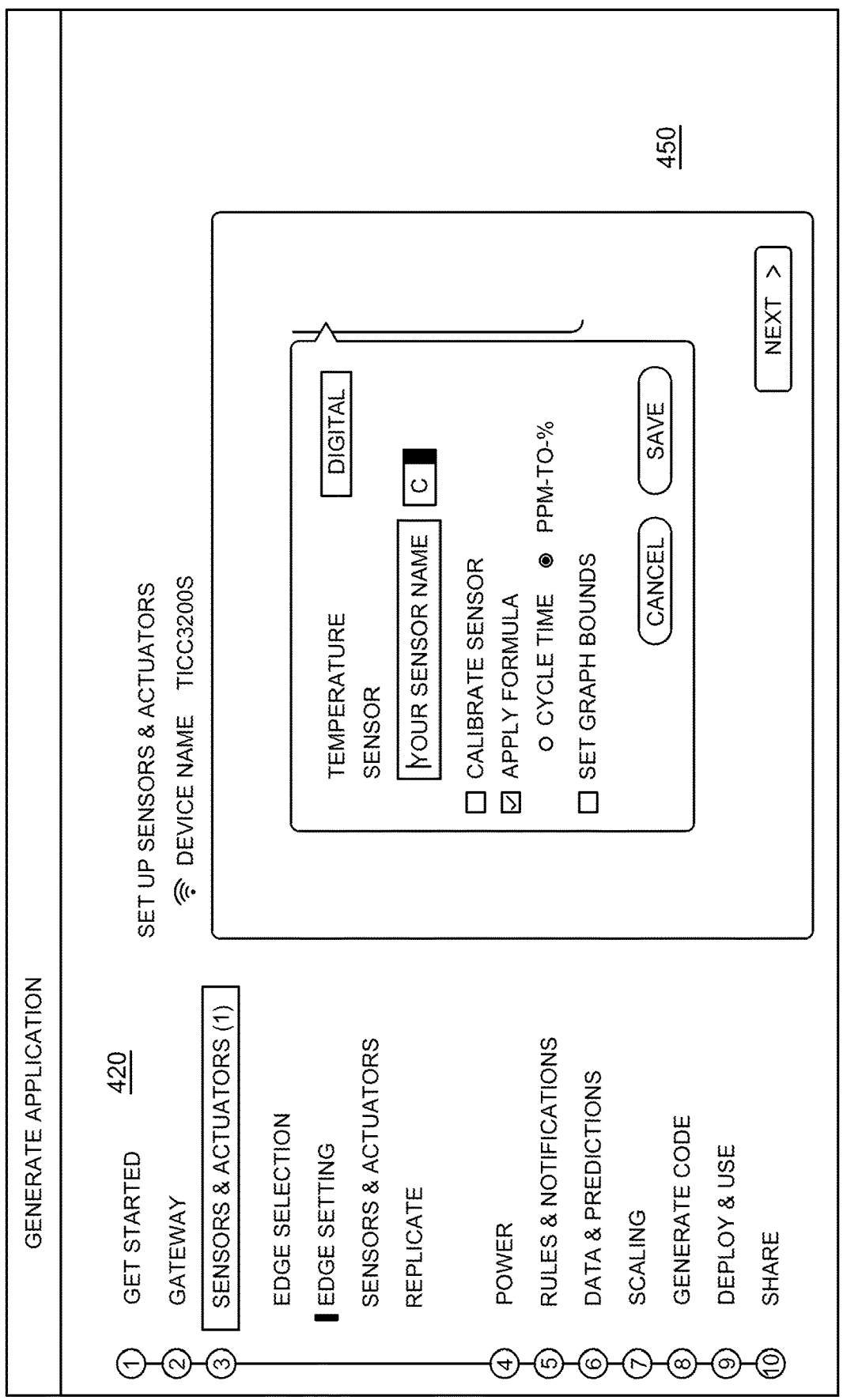
FIG. 4B depicts a graphical representation of a fifth onboarding menu in accordance with an embodiment of the present principles.

FIG. 4B depicts a graphical representation of a fifth onboarding menu 450 in accordance with an embodiment of the present principles. The fifth onboarding menu 450 of the embodiment of FIG. 4B enables a user to upload information required to configure and generate sensors and actuators for the edge devices. That is, once a user has selected a specific edge device type and given assigned a location and name, the user can set up sensors and actuators on the edge device. In some embodiments in accordance with the present principles, each edge device must have at least one sensor or one actuator. In some embodiments and as depicted in the fifth onboarding menu 450 of FIG. 4B, the device name is displayed on the top of the menu 450. In addition, in the fifth onboarding menu 450 of FIG. 4B the type of sensor is identified and a user is enabled to input a name for the sensor. In the fifth onboarding menu 450 of the embodiment of FIG. 4B a sensor calibration feature can be selected that enables the user to set a constant plus or minus offset to the sensor reading. This feature accounts for the reality of certain sensors consistently producing values that are too high or too low. In some embodiments, offset values can be specified in the chosen real world units for a subject sensor.

In the fifth onboarding menu 450 of FIG. 4B, a formula can be selected by a user to be applied to a sensor. In some embodiments, results can be selected by a user to be displayed in cycle time or PPM to % as depicted in the embodiment of the fifth onboarding menu 450 of FIG. 4B. In some embodiments and as depicted in the fifth onboarding menu 450 of FIG. 4B, sensors on edges devices can support the specification of graph safe bounds and graph caution bounds during the setup process. Setting graph bounds is optional in some embodiments.

In accordance with the present principles, each edge device that is configured during the onboarding flow can be multiplied so that a user does not have to go through the process of creating the same device many times. For example, if a user wants to configure ten identical temperature sensing edge devices, a user can configure the edge device once and multiply the configuration of the edge device by ten using the capabilities of the ACGUI 100 of FIG. 1. As such, ten instances of the configured edge device are created.

The limit to the number of edge devices of a given type that you can associate with a gateway via the UI will be dictated by the technical and practical limitations of the associated network interface. For example, Zigbee networks have a theoretical limit to the number of devices they can support (measured in the millions) and a practical limit that is influenced by numerous factors (typically measuring in the hundreds or thousands). The values for input that a user can enter via the UI when multiplying edges will be limited based experimental results.

Once an edge device has successfully been added, in some embodiments the user is returned to an updated view of the top-level edge step, which contains a list of the user's saved edge devices. An updated view of the top-level edge step can contain the edge device that was just created, and can grow as more edge devices are added (described in further detail below). The updated view of the top-level edge step can include but is not limited to at least the following four goals:
1. To provide a summary of the edge devices that a user has added (i.e., by displaying the edge device name, type, and creation date, etc.)
2. To provide a manner of accessing the details of saved edge devices so that details of saved edge devices can be edited.
3. To provide a means to delete saved edge devices, in one embodiment by:
   a. Hitting a delete button which will render a modal that ask the user to confirm that the selected object is to be deleted.
4. To provide a starting point for creating/adding more edge devices.

In some embodiments in accordance with the present principles, the process of adding consecutive edge devices is effectively the same as the process of adding a first edge device as described above, with a few exceptions. In some embodiments, when a user is adding an edge device after having created at least one edge device previously, a user will be provided the option to select an edge device to use as a starting point for the new edge device. For example, in some embodiments the user will be provided an option to clone an edge device and then edit the edge device to be added, making it easy to create variations on edge devices that a user has already previously configured. In some embodiments, when a user examines each stage of a setup menu for a cloned edge device, the menu can display the details of the edge device in an editable manner.

Another difference between adding a first edge device and adding subsequent edge devices is illustrated in the flow in the navigation menu 420 on the left side of the fifth onboarding menu 450 in FIG. 4B, which illustratively depicts that a user is currently adding an edge device as indicated by the number one (1) in parenthesis next to the label "Sensor & Actuators" in the navigation menu 420 on the left side of the fifth onboarding menu 450, which in some embodiments reflects the number of already created edge devices.

FIG. 5 depicts a graphical representation of a sixth onboarding menu 510 in accordance with an embodiment of the present principles. The sixth onboarding menu 510 of the embodiment of FIG. 5 enables a user to provide information about how the edge devices and gateway devices are powered. In the embodiment of the sixth onboarding menu 510 of FIG. 5, in a first section 511, the sixth onboarding menu 510 illustratively displays the name of the device which is being configured and a pull down selection menu to select a power option for the named device. In the embodiment of the sixth onboarding menu 510 of FIG. 5, in a second section 512, the sixth onboarding menu 510 illustratively displays the name of other devices (illustratively three other devices) and provides a respective pull down selection menu to select a power option for the other named devices. The sixth onboarding menu 510 of FIG. 5, illustratively further provides a selection box 513 for enabling the user to select a power option for all edge devices with a single selection.

For example, gateways are most commonly powered by wired power, but can also be powered by batteries, particularly in cases when the gateways are deployed outdoors. The gateway section of the power settings illustrated in the sixth onboarding menu 510 of FIG. 5 shows the gateway name, gateway type, and how the gateway is connected to the internet (ethernet, wifi or cellular), and enables a user to select between wired or battery power. The selections made by the user in the sixth onboarding menu 510 of FIG. 5 can influence the options available in subsequent onboarding processes. For example, in some embodiments, support for only Raspberry Pi gateways powered by wired power can be provided. In such embodiments, the power choice can be auto-selected and any selection options disabled. In such embodiments, the sixth onboarding menu 510 of FIG. 5 functions more as a communication mechanism that informs the user about the power source to use, as opposed to giving the user the means to make a choice about power sources.

The edge section of the power settings is basically the same as the gateway section above and enables a user to choose between battery and wired power for each edge device that the user has created. For each edge device, the name, type, and gateway/internet connectivity option (WiFi, Bluetooth, Zigbee, Modbus) is displayed. Again, this choice may be automatically made depending on the choice of edge hardware, and there is also a global setting to set all edge devices to the same type of power. In some embodiments, this option will only appear if all edges can be set to use the same type of power source. In some embodiments in accordance with the present principles, a power setting menu such as the sixth onboarding menu 510 of FIG. 5 can be configured to provide more detailed power information such as a power source having more than one battery or specific configuration details for various power sources.

Figure 6A:
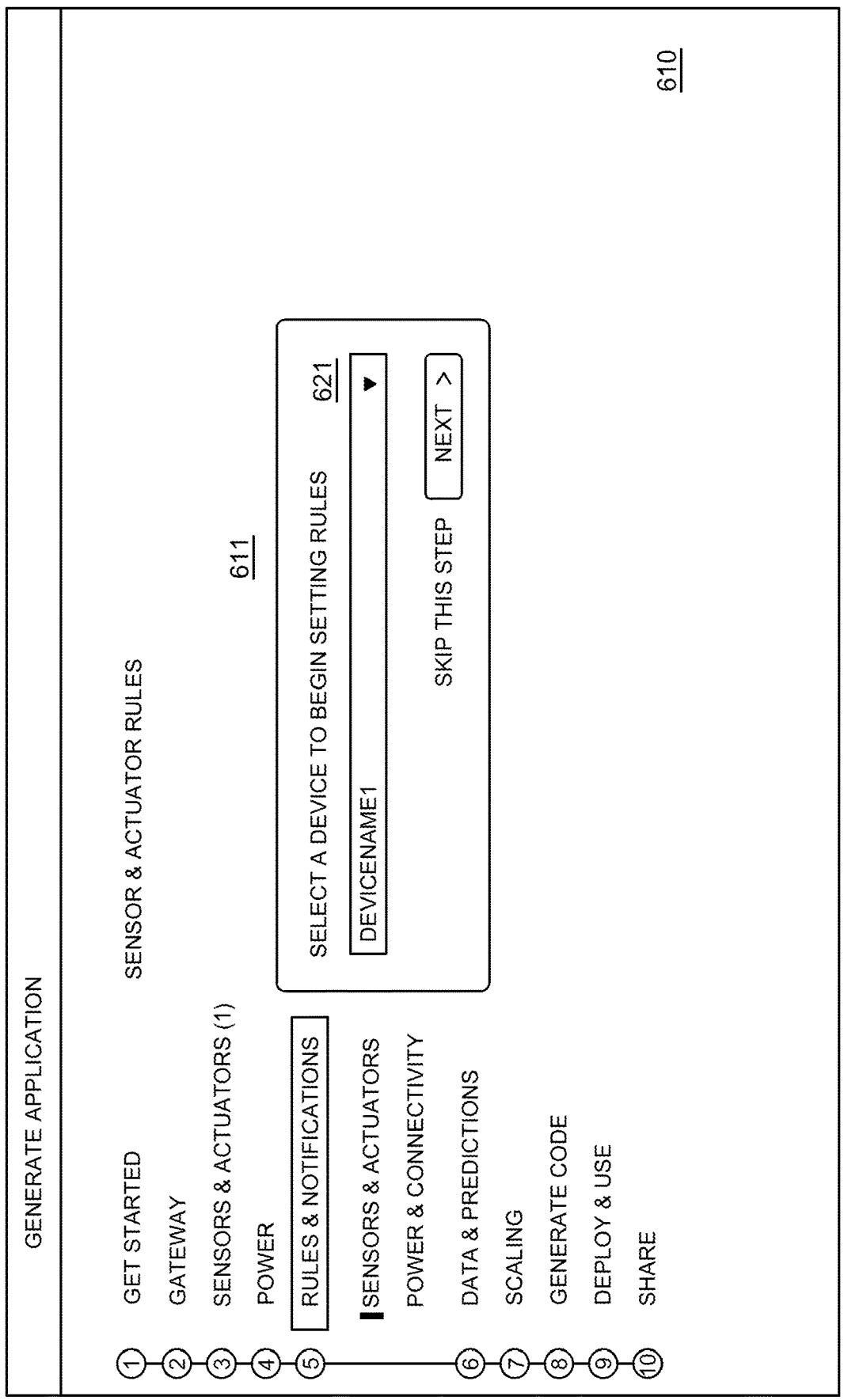
FIG. 6A depicts a graphical representation of a first portion of an optional seventh onboarding menu in accordance with an embodiment of the present principles.
Figure 6B:
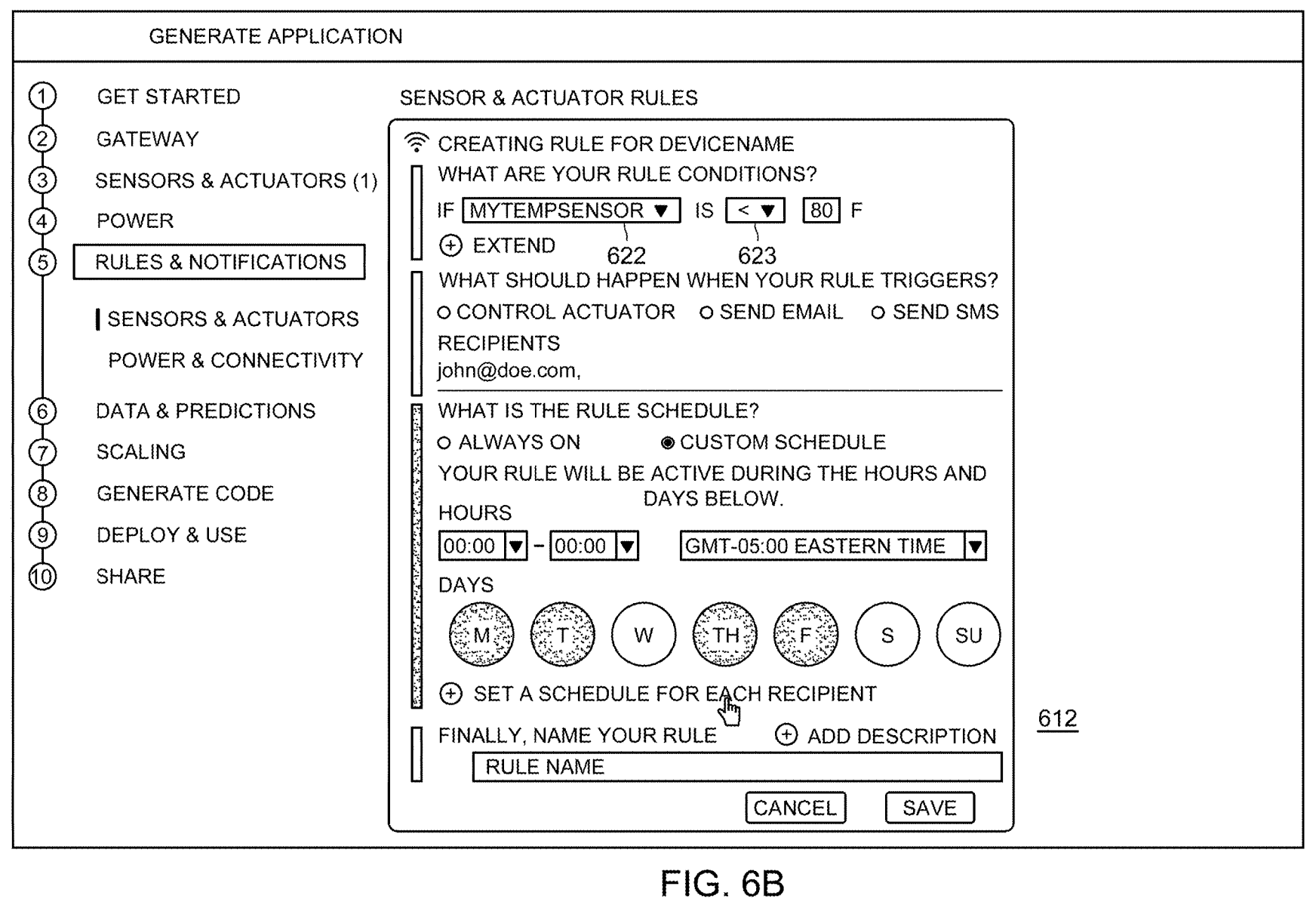

FIGS. 6A and 6B depict graphical representations of a first portion 611 and second portion 612 of an optional seventh onboarding menu 610 in accordance with an embodiment of the present principles. The seventh onboarding menu 610 of the embodiment of FIGS. 6A and 6B enables a user to provide information regarding rules for the sensors and actuators to be configured. In some embodiments, creating rules and notifications is not a necessary component of an ACGUI of the present principles and as such, the sixth onboarding menu can be considered optional.

In the embodiment of the first portion 611 of the seventh onboarding menu 610 depicted in FIG. 6A, a user is enabled to select a device for which to configure rules via a drop down selection menu 621. In addition, as depicted in the first portion 611 of the sixth onboarding menu 610 of FIG. 6A, a user is also able to skip the process of providing rules and notifications for the devices.

The second portion 612 of the seventh onboarding menu 610 depicted in FIG. 6B can, in some embodiments, comprise additional sections of the seventh onboarding menu 610 depicted in FIG. 6A or can, in some embodiments, comprise a separate menu from the seventh onboarding menu 610 depicted in FIG. 6A. In the embodiment of the seventh onboarding menu 610 depicted in FIG. 6B, the name of the device for which a rule and/or notification is being configured is displayed on the top of the menu 610. As depicted in the second portion 612 of the seventh onboarding menu 610 depicted in FIG. 6B, a user is able to select, from a drop down menu 622, available parameters that can be monitored for the device for which a rule is being configured. That is, based on the device which is selected for configuration, the menu/system populates and enables a user to select a parameter(s) able to be monitored for the device being configured.

Illustratively, in the embodiment of the seventh onboarding menu 610 depicted in FIG. 6B, on the same line, a user is able to select from a drop down menu 623 a condition for the monitored parameter. For example, in the embodiment of the seventh onboarding menu 610 depicted in FIG. 6B, a user selected a temperature to be monitored and selected a condition of 'if the temperature is less than'. Illustratively, in the embodiment of the seventh onboarding menu 610 depicted in FIG. 6B, on the same line, a user is able to input a threshold value for the condition. For example, in the embodiment of the seventh onboarding menu 610 depicted in FIG. 6B, a user provided the temperature of 80 degrees as a threshold value for the condition. In some embodiments, such as the embodiment of the seventh onboarding menu 610 depicted in FIG. 6B, an onboarding menu in for defining conditional rules and triggers further includes an 'Extend' feature. The Extend feature enables a user to input additional conditional rules and triggers.

In the embodiment of the seventh onboarding menu 610 depicted in FIG. 6B, a user is enabled to select what should happen when the rule the user configured is triggered. Illustratively, in the embodiment of the sixth onboarding menu 610 depicted in FIG. 6B, three choices are provided for user selection:
1. To control an actuator of the device being configured,
2. To send an email to, for example, an administrator of a system being configured,
3. To send an SMS message to, for example, an administrator of the system.

In the embodiment of the seventh onboarding menu 610 depicted in FIG. 6B, contact details of the person(s) to whom an email or SMS message is to be communicated are displayed. In some embodiments, a user is able to provide the contact details of the person(s) to whom an email or SMS message is to be communicated using the seventh onboarding menu 610 depicted in FIG. 6B.

As depicted in the embodiment of the seventh onboarding menu 610 depicted in FIG. 6B, in some embodiments a user is able to provide details regarding the rule schedule. Illustratively, in the seventh onboarding menu 610 depicted in FIG. 6B, a user is able to select between having a configured rule always on or providing a custom schedule. The seventh onboarding menu 610 depicted in FIG. 6B enables a user to input a beginning time and an ending time for the rule and is able to select on which days of the week the rule should be applied. In some embodiments and as depicted in the seventh onboarding menu 610 depicted in FIG. 6B, a user can be enabled to set more than one beginning time and an ending time for the rule and different days for the beginning and ending times for the rule.

Figure 7:
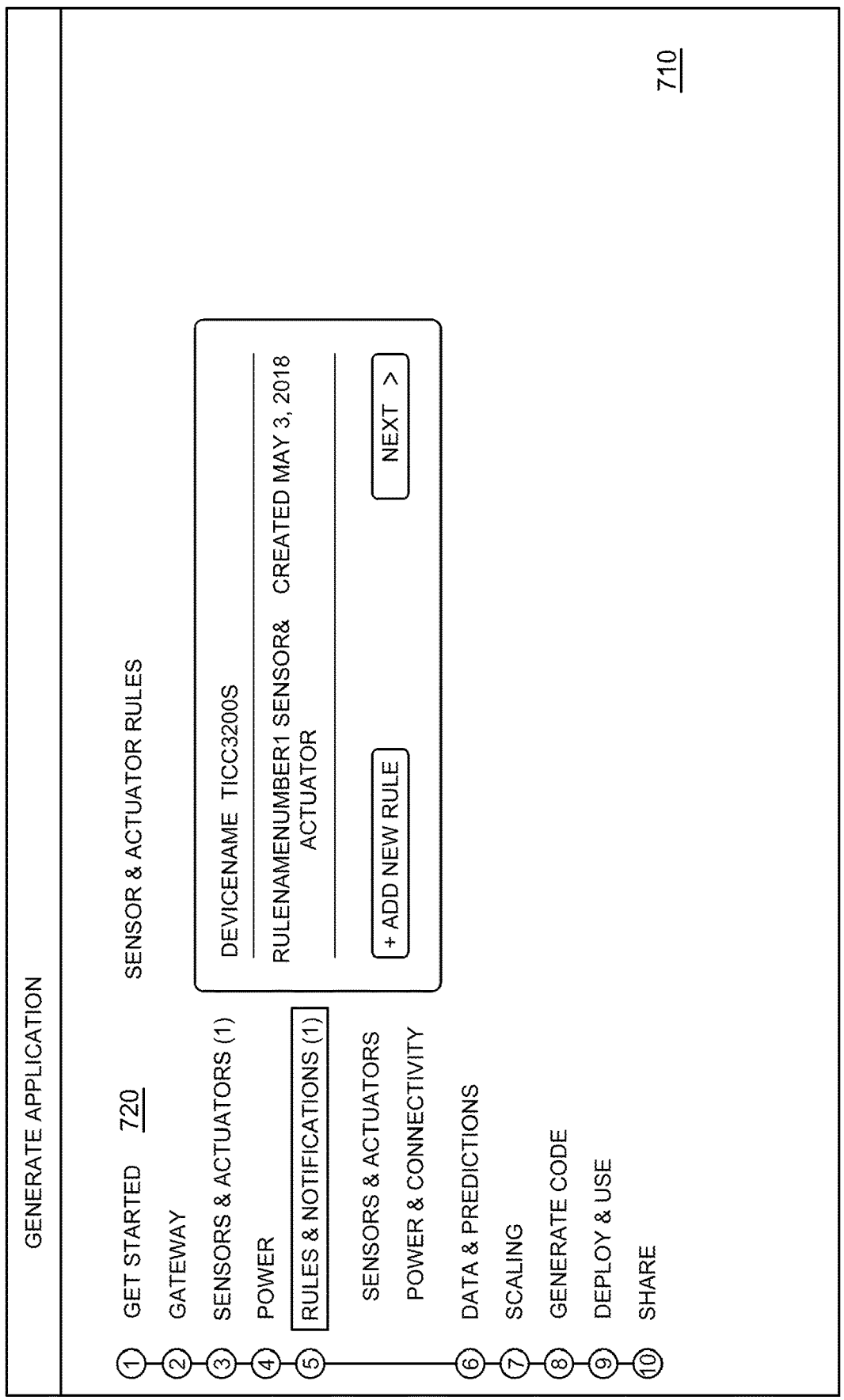
FIG. 7 depicts a graphical representation of an optional summary menu in accordance with an embodiment of the present principles.

The seventh onboarding menu 610 enables a user to give the configured rule a name and to save the rule configuration. When a rule is saved, the user is returned to the top-level of the rules & notifications section, which can display a summary of a user's configured rules. For example, FIG. 7 depicts a graphical representation of an optional summary menu 710 in accordance with an embodiment of the present principles. In some embodiments and as depicted in the summary menu 710 of FIG. 7, the summary menu 710 can be segmented by device name (augmented with device type), and can display at least the following information for each rule belonging to an edge device:
Rule name
Rule type ("Sensor & Actuator")
Creation date.

From the summary menu 710 a user is able to select to create another rule or to continue to setting up device health rules. As depicted in the summary menu 710 of FIG. 7, in some embodiments, one a rule has been created, the navigation menu 720 on the left side of the summary menu 710 is updated to reflect the number of already created rules.

Figure 8:
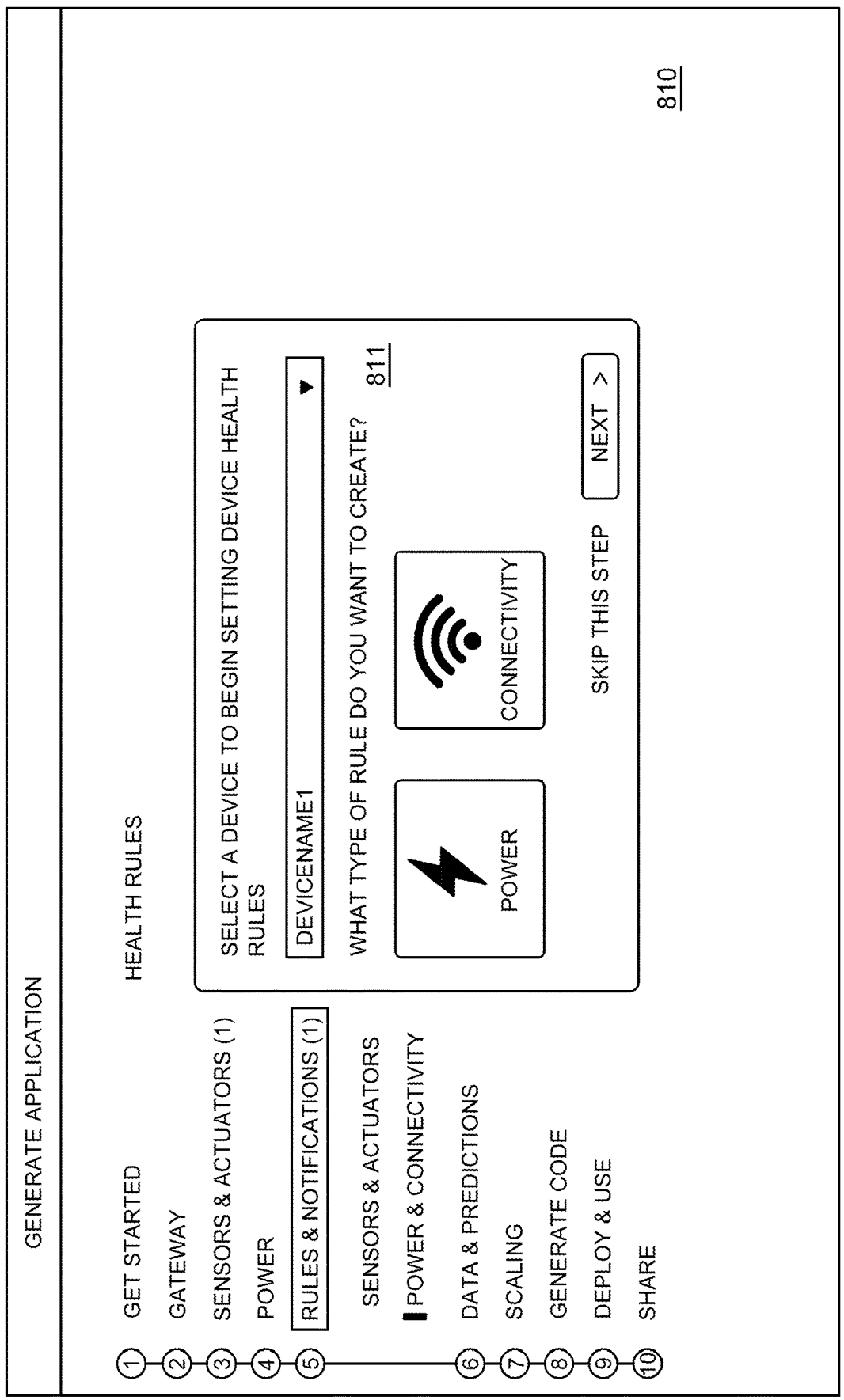
FIG. 8 depicts a graphical representation of an optional eighth onboarding menu in accordance with an embodiment of the present principles.

FIG. 8 depicts a graphical representation of an optional eighth onboarding menu 810 in accordance with an embodiment of the present principles. The eighth onboarding menu 810 of the embodiment of FIG. 8 enables a user to provide information regarding device health rules, which can be applied to both gateway and edge devices. In some embodiments, like with the sensor & actuator health rules, the device health rules begin with the selection of a device, and that choice is augmented with a choice about the type of device health rule that the user wants to create, which is dependent on the capabilities of the selected device. For example, a user won't be able to set power rules if the user is not using a device with a battery. If only one type of device health rule is available, in some embodiments the selection will be made automatically and won't be editable. In the embodiment depicted in the eighth onboarding menu 810 of FIG. 8, once a rule type (power or connectivity) has been selected, the rule will appear in a progressive manner in a way that maps to how the sensor & actuator rules appear.

In the embodiment of the eighth onboarding menu 810 depicted in FIG. 8, a user is enabled to select a device for which to configure health rules via a drop down selection menu 811. In addition, as depicted in the eighth onboarding menu 810 of FIG. 8, a user is also able to skip the process of providing health rules for the devices. When a rule is saved, the rule appears in the rule summary list in the same manner as the sensor & actuator rules.

In some embodiments, rules can be edited by selecting a rule from a rule summary menu, such as the rule summary menu 710 depicted in FIG. 7, which presents to a user a rule edit state.

FIG. 9 depicts a graphical representation of an optional ninth onboarding menu 910 in accordance with an embodiment of the present principles. The ninth onboarding menu 910 of the embodiment of FIG. 9 enables a user to perform at least the following operations:

1. Capture preference information about gateway-to-cloud and edge-to-gateway sensor data frequency
2. Capture preference information about insight features
3. Capture various types of information that will not be used immediately, but will inform product and PO activities. At a minimum this information should be stored in the database, and will potentially be integrated into TPS.
4. Configure third-party cloud integrations More specifically and as depicted in the ninth onboarding menu 910 of FIG. 9, a sensor data frequency section enables a user to provide information about how frequently edges will send data to service provider system, and how frequently edges will send data to the gateway. In accordance with embodiments of the present principles, the system can make a recommendation to the user regarding, for example, a sensor data frequency, based on how the sensor has been configured. For example, in the case of edge devices operating on batteries, sensor data can be sent to the cloud less frequently in order to save energy consumed by using the edge device's radio. For example and as depicted in the ninth onboarding menu 910 of FIG. 9, a recommendation is made to communicate sensor data every 30 minutes.

In the embodiment depicted in the ninth onboarding menu 910 of FIG. 9, a user is enabled to select a time period from a drop down menu, which can include the following options:
Every 30 seconds
Every minute
Every 5 minutes
Every 30 minutes
Every hour
Once per day
Custom (A value that can be expressed in time).

In some embodiments, based on a value determined for sensor data frequency, a determination can be made by the system for communication of edge sensor data to the gateway. For example, in the ninth onboarding menu 910 of FIG. 9, a recommendation is made to communicate edge sensor data to the gateway every 20 seconds.

As further depicted in FIG. 9, the ninth onboarding menu 910 enables a user to decide whether or not to accept sensor predictions from the system. For example, in the embodiment of FIG. 9, the ninth onboarding menu 910 includes two toggle switches which enable a user to select whether or not to enable the system to notify the user regarding abnormal events in system data and whether or not to notify the user when the system predicts that sensor health rules will be triggered. That is, in some embodiments, the system implements at least one of machine learning, linear regression analysis and neural networks to determine when abnormal events in system data have occurred or will occur and when sensor health rules will be triggered.

In the embodiment depicted in FIG. 9, the ninth onboarding menu 910 enables a user to select from a series of checklists that enables the system to collect information on how a user is wanting to improve physical operations. In some embodiments, the checklists options can include:
Minimize machine downtime
Increase process output
Reduce resource consumption
Collect product analytics Furthermore, in some embodiments and as depicted in FIG. 9, the ninth onboarding menu 910 can enable a user to define types of external data to be included with device data, such as sensor data. For example and as depicted in FIG. 9, some selections for external data sources can include:
Weather data
Financial data
Customer support data
Business metrics
Infrastructure metrics
Internal database or API data.

More specifically and as described above, some embodiments of the present invention implement at least one of machine learning algorithms and models, linear regression analysis and models, neural networks, and other learning algorithms that can be trained based on data generated at, in some embodiments, runtime by all different connected devices to predict failures and optimize device performance. Optimization constraints (i.e., Behavioral Constraints) are states that the application needs to reach over time (i.e., optimal target that algorithms will try to predict or sense). For example, in some embodiments, some predictive states to attempt to predict/achieve in accordance with the present principles can include power saving, sensor calibration, predictive maintenance, maximize or minimize an output, etc. In some embodiments, alerts can be generated and communicated to a user when anomalies are detected, when there is a change of device/system behavior and the like.

In some embodiments, the predictive applications can evolve over time based on results of learning algorithms, such as at least one of machine learning algorithms, linear regression analysis and neural networks, that are able to learn behaviors and patterns of associated devices and systems as a whole. An application using ML (that constitute what we call a learning system) to improve its design is self-healing.

In some embodiments, predictive analysis in accordance with the present principles includes machine learning in a Cloud/remote server environment which implements a library of algorithms that can be trained in real time with data sets generated at runtime. The results of these algorithms are then analyzed in real time for accuracy and to automatically fine tune parameters. That is, an algorithm that is proven effective can be used to predict the behavior of a device/system or application and to automatically fine tune, for example, operating parameters of a device/system. Alternatively or in addition, in some embodiments, algorithms can be trained off-line with data sets previously generated and the results of the algorithms can be analyzed off-line or in real time for accuracy.

In some exemplary embodiments of a predictive analysis process in accordance with the present principles, the following applications were considered:
Machine productivity and on/off status monitoring;
Cloud-based storage and end-user applications for various sensor devices; and
Data center energy usage optimization.

In such applications, automated alerts can be implemented. For example, in some embodiments a monitoring/machine learning system can learn what is considered anomalous operating conditions for a device/system and communicate an alert to, for example, a user to notify the user of a failure of a device/system. Alternatively or in addition, the monitoring/machine learning system can be informed what is an anomalous operating condition for a device/system and communicate an alert to, for example, a user to notify the user of a failure of the device/system when the anomalous operating condition is detected.

Figure 18:
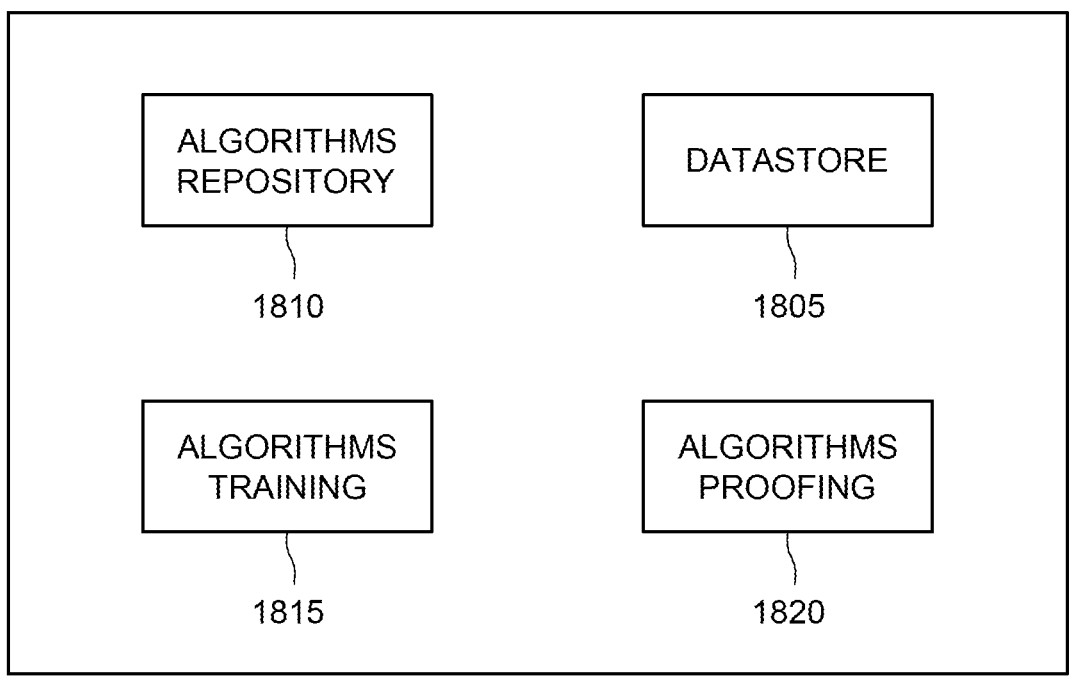
FIG. 18 depicts a high level functional, block diagram of a monitoring/prediction system in accordance with an embodiment of the present principles.

FIG. 18 depicts a high level functional, block diagram of a monitoring/prediction system 1800 in accordance with an embodiment of the present principles. In the embodiment of FIG. 18, the monitoring/prediction system 1800 illustratively includes a datastore 1805, an algorithms repository 1810, an algorithms training module 1815, and an optional algorithms proof module 1820. In the embodiment of FIG. 18, the datastore 1805 stores data regarding the operation and data collected from the various sensors and other system devices. The algorithm repository 1810 stores algorithms to be applied to the data in the datastore 1805 for performing predictive analysis in accordance with the present principles. In some embodiments, a user is able to select which algorithm from the algorithms repository 1810 to apply to the data. Alternatively or in addition, in some embodiments an algorithm from the algorithm repository 1810 can be automatically selected by the monitoring/machine learning system 1800 depending upon which application is to be performed and, as such, which device/system functionality/parameter is to be predicted.

In the monitoring/prediction system 1800 of FIG. 18, the algorithms training module 1815 can implement data from the datastore 1805 to train an algorithm to predict/learn/identify a parameter/functionality of a device/system. That is, in some embodiments, the algorithms training module 1815 can use data from the datastore 1805 to determine an algorithm able to identify, for example, when an event or failure will occur for a device/system using, for example, machine learning. Such determined algorithm can then be stored in the algorithms repository 1810.

In the monitoring/prediction system 1800 of FIG. 18, the optional algorithms proof module 1820 can be implemented to verify the functionality of any of algorithms determined by the algorithms training module 1815 and algorithms stored in the algorithms repository 1810.

The monitoring/prediction system 1800 of FIG. 18 is able to predict a future state of a given sensor using data stored in the datastore 1805 as described above. That is, in some embodiments, the monitoring/prediction system 1800 is able to provide a user with a prediction of an individual sensor reading at a specified point in the future. In some embodiments, the monitoring/prediction system 1800 is further able to provide a measure of confidence that the value will fall within a given range. For example, in one exemplary embodiment the monitoring/prediction system 1800 of FIG. 18 can indicate with a measure of certainty that the temperature of water in a specific water tank can be within a specific temperature range at a certain time and on a certain date by analyzing the data stored in the datastore 1805. The monitoring/prediction system 1800 in accordance with the present principles is also able to make higher-level predictions about the future states of groups of sensors, groups of devices, and application-specific states, such as service schedules for devices in order to avoid downtime.

In some embodiments, a monitoring/prediction system in accordance with the present principles combines sensor data prediction with knowledge of sensor thresholds to enable a proactive warning to be generated about upcoming error states. This is a more focused version of the message delivered by the sensor data prediction feature, or a version of automated alerts that can see into the future. This feature can communicate an exemplary message such as: "There is a 99% certainty that the temperature in water_tank_1 will be above the desired threshold in 5 hours from now."

In addition in some embodiments, sensor correlations are implemented by a monitoring/prediction system in accordance with the present principles to describe a relationship between two or more independent streams of sensor data in a way that is actionable by the owner of the data. Taking the machine productivity and on/off status monitoring as an example, a user might like to know how the cycle time on an injection molding machine is affected by the temperature of the oil used as input to the machine. Such feature can be generalized and enable users to explore correlations between different sensors in applications. In some embodiments, for system optimization a monitoring/prediction system in accordance with the present principles can monitor a consumable resource and adjust operating parameters of devices of a system or a system overall to minimize or maximize a consumption of the monitored resource as desired.

Figure 19:
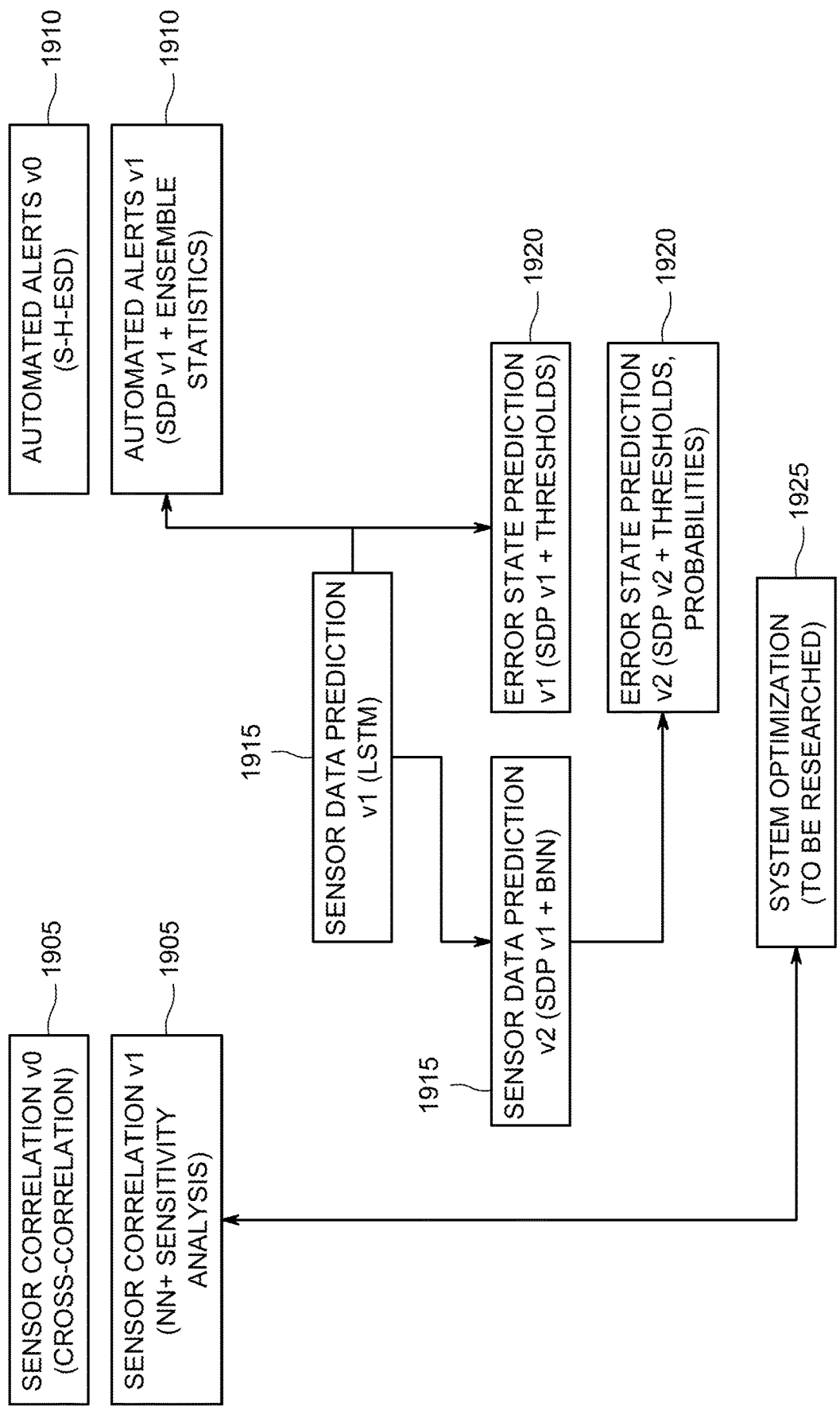
FIG. 19 depicts a high level functional diagram of the relationships between some exemplary predictive features in a monitoring/prediction system in accordance with an embodiment of the present principles.

In a monitoring/prediction system in accordance with the present principles, such as the monitoring/prediction system 1800 of FIG. 18, the intelligence features build upon one another. More specifically, FIG. 19 depicts a high level functional diagram of the relationships between some exemplary predictive features in a monitoring/prediction system in accordance with an embodiment of the present principles. As depicted in the embodiment of FIG. 19, predictive features of a monitoring/prediction system in accordance with the present principles can include sensor correlation 1905, automated alerts 1910, sensor data prediction 1915, error state prediction 1920, and system optimization 1925. In some embodiments, features of a monitoring/prediction system in accordance with the present principles can be implemented using a machine learning approach. In some embodiments, a monitoring/prediction system in accordance with the present principles can be implemented using a statistical approach. In some embodiments, a monitoring/prediction system in accordance with the present principles can be implemented using a combination of statistical approaches and machine learning approaches.

In some embodiments, for sensor correlation 1905, cross-correlation can be calculated using a scientific computing tool such as an established python library. For example, in some embodiments cross-correlation can be calculated using Numpy and Scipy, which comprise packages in python used for scientific computing. In some embodiments, sensor data can be tracked against an overarching metric, for example cycle time, and a model can be determined for how a sensor correlates to that "goal metric." In some embodiments, the tracking can be accomplished by constructing a neural network that has access to the sensor data (and potentially other pertinent data such as ambient weather) and outputs a prediction of the goal metric. The affects of certain variables can then be isolated by linearly varying one input variable at a time while holding all others constant.

In some embodiments, for automated alerts 1910 (related to anomaly detection), the application of statistical methods can be implemented to identify outliers and accurately label them as anomalies. In some embodiments, an Extreme Studentized Deviate (ESD) approach can be implemented to identify outliers. In one particular embodiment, a Seasonal Hybrid ESD (S-H-ESD) is implemented to identify anomalies. The idea behind the S-H-ESD method is to use STL decomposition ("Seasonal and Trend decomposition using Loess") to remove seasonality. With the seasonality removed, genuine outliers can be more accurately be indentified, in one embodiment, using a generalized extreme Studentized deviate test.

As a baseline, S-H-ESD provides a strong starting point to begin exploring a machine learning approach. As the datasets per account grow, machine learning models can be trained that can outperform S-H-ESD. The feasible alternative approaches based on machine learning rely on the ability to accurately predict sensor data.

Alternatively or in addition, in some embodiments an ensemble of statistical methods are implemented against an anomaly score generated by a Sensor Data Prediction model implemented for the sensor date prediction feature 1915. That is, a completion of the Sensor Data Prediction intelligence feature expands the techniques available for the Automated Alerts feature 1920. For example, the observed value of a sensor can be compared to a machine learning-driven prediction about what the value "should" be (this is known as the anomaly score). In some embodiments, a fixed threshold is set for the absolute value of the anomaly score. Alternatively or in addition, an accumulator can be implemented to tally anomalies or to calculate tail probabilities using rolling means and variance.

In some embodiments, for sensor data prediction 1915 a long short-term memory (LSTM) network can be implemented in TensorFlow. Such configuration enables a leverage of the time series nature of the data. It is also important to note that there is an implicit assumption of periodicity in sensor data. That is, there are observable patterns in the data over time. In some embodiments, to calculate confidence values, a Bayesian Neural Network (BNN) can be implemented.

In some embodiments, for the error state prediction feature 1920, a user can be enabled to set a time scale and a sensor threshold value using the sensor data prediction model. For example, if it is predicted that the sensor value will be above/below a respective threshold value at the given time scale, such information can be reported to a user, and/or an alert can be communicated whenever the system predicts an error state.

In some embodiments, after Sensor Data Prediction v2 (implementing a neural network, such as a Binary neural network) a probability can be associated with the threshold, triggering the alert only when the threshold is overcome with some degree of confidence. In some embodiments, for system optimization 1925, a neural network powered by, in some embodiments, TensorFlow is implemented.

In addition to neural networks, in some embodiments in accordance with the present principles, other learning algorithms can be applied for performing various functionalities of the described embodiments in accordance with the present principles, including at least automatically determining configuration information and application logic information and predictive analysis. More specifically, machine learning tasks are typically classified into two broad categories, depending on whether there is a learning "signal" or "feedback" available to a learning system, namely Supervised learning and Unsupervised learning.

In Supervised learning, a computer is presented with example inputs and their desired outputs, given by a "teacher", and the goal is to learn a general rule that maps inputs to outputs. As special cases, the input signal can be only partially available, or restricted to special feedback. Supervised learning can include Semi-supervised learning in which a computer is given only an incomplete training signal: a training set with some (often many) of the target outputs missing. In some embodiments Supervised learning can also include Active learning in which a computer can only obtain training labels for a limited set of instances (based on a budget), and also has to optimize its choice of objects for which to acquire labels. When used interactively, these can be presented to the user for labeling. In some embodiments, Supervised learning can also include Reinforcement learning, in which training data (in form of rewards and punishments) is given only as feedback to the programs actions in a dynamic environment, such as driving a vehicle or playing a game against an opponent.

For Unsupervised learning, no labels are given to the learning algorithm, leaving the algorithm on its own to find structure in its input. Unsupervised learning can be a goal in itself (discovering hidden patterns in data) or a means towards an end (feature learning).

As recited above, in addition to neural networks, in some embodiments in accordance with the present principles, other learning algorithms can be applied for implementing predictive analysis and other functionalities of the present principles. For example, in some embodiments, Decision tree learning can be implemented. Decision tree learning uses a decision tree as a predictive model, which maps observations about an item to conclusions about the item's target value. Alternatively or in addition, in some embodiments Association rule learning can be implemented for predictive analysis other related features of the present principles as described above. Association rule learning is a method for discovering interesting relations between variables in large databases. Alternatively or in addition, in some embodiments Deep learning can be implemented for predictive analysis other related features of the present principles as described above. Deep learning consists of multiple hidden layers in an artificial neural network. This approach attempts to model the way the human brain processes inputs.

In some embodiments in accordance with the present principles, other learning algorithms and techniques, including but not limited to Inductive logic programming, Support vector machines, Clustering, Bayesian networks, Reinforcement learning, Representation learning, Similarity and metric learning, Sparse dictionary learning, Genetic algorithms, Rule-based machine learning, Learning classifier systems, and the like can be implemented for predictive analysis other functionalities of the present principles.

Inductive logic programming (ILP) is an approach to rule learning using logic programming as a uniform representation for input examples, background knowledge, and hypotheses. Given an encoding of the known background knowledge and a set of examples represented as a logical database of facts, an ILP system will derive a hypothesized logic program that entails all positive and no negative examples. Inductive programming is a related field that considers any kind of programming languages for representing hypotheses (and not only logic programming), such as functional programs.

Support vector machines (SVMs) are a set of related supervised learning methods used for classification and regression. Given a set of training examples, each marked as belonging to one of two categories, an SVM training algorithm builds a model that predicts whether a new example falls into one category or the other.

Cluster analysis is the assignment of a set of observations into subsets (called clusters) so that observations within the same cluster are similar according to some predesignated criterion or criteria, while observations drawn from different clusters are dissimilar. Different clustering techniques make different assumptions on the structure of the data, often defined by some similarity metric and evaluated for example by internal compactness (similarity between members of the same cluster) and separation between different clusters. Other methods are based on estimated density and graph connectivity. Clustering is a method of unsupervised learning, and a common technique for statistical data analysis.

A Bayesian network, belief network or directed acyclic graphical model is a probabilistic graphical model that represents a set of random variables and their conditional independencies via a directed acyclic graph (DAG). For example, a Bayesian network could represent the probabilistic relationships between diseases and symptoms. Given symptoms, the network can be used to compute the probabilities of the presence of various diseases. Efficient algorithms exist that perform inference and learning.

Reinforcement learning is concerned with how an agent ought to take actions in an environment so as to maximize some notion of long-term reward. Reinforcement learning algorithms attempt to find a policy that maps states of the world to the actions the agent ought to take in those states. Reinforcement learning differs from the supervised learning problem in that correct input/output pairs are never presented, nor sub-optimal actions explicitly corrected.

Several learning algorithms, mostly unsupervised learning algorithms, aim at discovering better representations of the inputs provided during training. Classical examples include principal components analysis and cluster analysis. Representation learning algorithms often attempt to preserve the information in their input but transform it in a way that makes it useful, often as a pre-processing step before performing classification or predictions, allowing reconstruction of the inputs coming from the unknown data generating distribution, while not being necessarily faithful for configurations that are implausible under that distribution.

Manifold learning algorithms attempt to do so under the constraint that the learned representation is low-dimensional. Sparse coding algorithms attempt to do so under the constraint that the learned representation is sparse (has many zeros). Multilinear subspace learning algorithms aim to learn low-dimensional representations directly from tensor representations for multidimensional data, without reshaping them into (high-dimensional) vectors. Deep learning algorithms discover multiple levels of representation, or a hierarchy of features, with higher-level, more abstract features defined in terms of (or generating) lower-level features. It can be argued that an intelligent machine is one that learns a representation that disentangles the underlying factors of variation that explain the observed data.

In Similarity and metric learning, the learning machine is given pairs of examples that are considered similar and pairs of less similar objects. The learning machine then needs to learn a similarity function (or a distance metric function) that can predict if new objects are similar. Similarity and metric learning is sometimes used in Recommendation systems.

In Sparse dictionary learning a datum is represented as a linear combination of basis functions, and the coefficients are assumed to be sparse. Learning a dictionary along with sparse representations is strongly NP-hard and also difficult to solve approximately. A popular heuristic method for sparse dictionary learning is K-SVD. Sparse dictionary learning has been applied in several contexts. In classification, the problem is to determine which classes a previously unseen datum belongs to. Suppose a dictionary for each class has already been built. Then a new datum is associated with the class such that it's best sparsely represented by the corresponding dictionary. Sparse dictionary learning has also been applied in image de-noising. The key idea is that a clean image patch can be sparsely represented by an image dictionary, but the noise cannot.

A genetic algorithm (GA) is a search heuristic that mimics the process of natural selection, and uses methods such as mutation and crossover to generate new genotype in the hope of finding good solutions to a given problem. In machine learning, genetic algorithms found some uses in the 1980s and 1990s. Conversely, machine learning techniques have been used to improve the performance of genetic and evolutionary algorithms.

Rule-based machine learning is a general term for any machine learning method that identifies, learns, or evolves rules to store, manipulate or apply, knowledge. The defining characteristic of a rule-based machine learner is the identification and utilization of a set of relational rules that collectively represent the knowledge captured by the system. This is in contrast to other machine learners that commonly identify a singular model that can be universally applied to any instance in order to make a prediction. Rule-based machine learning approaches include learning classifier systems, association rule learning, and artificial immune systems.

Learning classifier systems (LCS) are a family of rule-based machine learning algorithms that combine a discovery component (e.g. typically a genetic algorithm) with a learning component (performing either supervised learning, reinforcement learning, or unsupervised learning). LCS seek to identify a set of context-dependent rules that collectively store and apply knowledge in a piecewise manner in order to make predictions.

In addition to implementing learning algorithms for predictive analysis and other functionality of the present principles, such learning algorithms can be implemented for reprogramming devices or sensors to, for example extend the capabilities of a device or system, based on an analysis using the learning algorithms of data collected by the devices or system. For example, in some embodiments, data collected by devices and/or sensors of a network, such as an end to end IoT network, can be monitored and analyzed by learning algorithms. Based on the analysis, programming code generated for the devices and/or sensors of the system can be programmed or reprogrammed to achieve a desired result, for example, to extend the operating life of a device and/or sensor of the system. For example, in one exemplary embodiment, if a learned analysis of sensor data indicates that such sensors tend to quickly expend battery life, the power to non-essential functions or functionality of such sensors can be reduced or completely eliminated based on the learned analysis to attempt to prolong the operating life of such sensors. In some embodiments, at least one of the operating parameters and/or the application logic of devices can be reprogrammed. Alternatively or in addition, interconnections/pathways can also be reprogrammed in accordance with the present principles.

Alternatively or in addition, in some embodiments devices and/or sensors of a network, such as an end to end IoT network, can be reprogrammed based on the raw data collected by the devices and/or sensors. For example in one exemplary embodiment, if it is determined from sensor data that a battery of the sensor is running low, the power to non-essential functions or functionality of the sensor can be reduced or completely eliminated based on the raw data to attempt to prolong the operating life of the sensor. In some embodiments, at least one of the operating parameters and/or the application logic of devices can be reprogrammed. Alternatively or in addition, interconnections/pathways can also be reprogrammed in accordance with the present principles.

Referring back to FIG. 9, in some embodiments and as depicted in FIG. 9, the ninth onboarding menu 910 can enable a user to identify the user's interest in sharing of sensor data that, in some embodiments, can be considered for the public good.

In some embodiments, and as depicted in FIG. 9, the ninth onboarding menu 910 can further include a link to a menu that enables a user to send sensor data to third-party clouds. For example, in some embodiments selections for third-party cloud choices can include:

Amazon Web Service (AWS)
Azure
Google Cloud.

Figure 10:
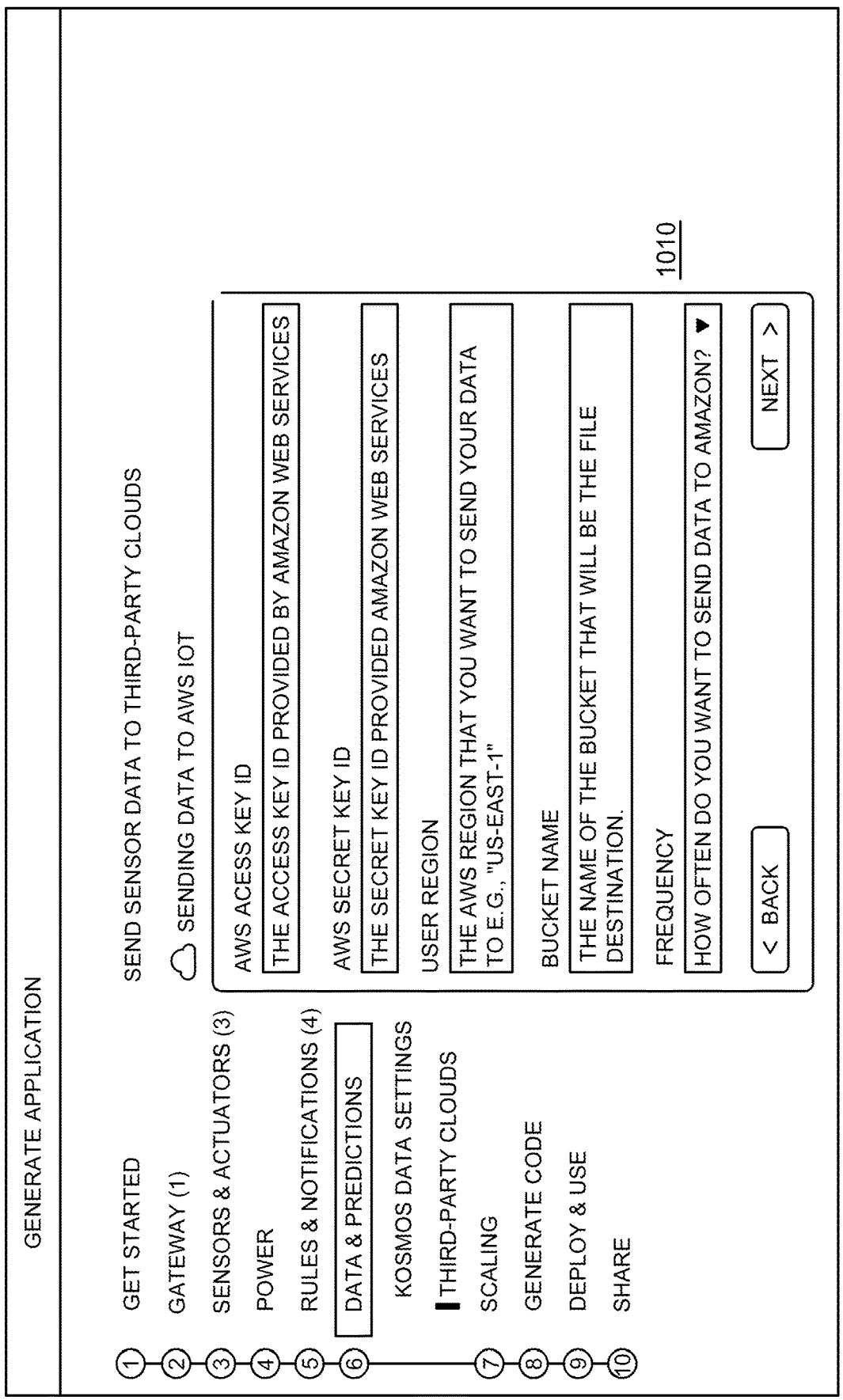
FIG. 10 depicts a graphical representation of an optional third-party cloud provider configuration menu in accordance with an embodiment of the present principles.

In some embodiments, selecting a cloud provider begins the flow of configuring the third-party cloud provider to accept sensor data. For example, FIG. 10 depicts a graphical representation of an optional third-party cloud provider configuration menu 1010 in accordance with an embodiment of the present principles. The third-party cloud provider configuration menu 1010 of the embodiment of FIG. 10 illustratively enables a user to configure communication with an AWS. In the embodiment of FIG. 10, the user is able to provide information regarding at least the following items:

AWS access key ID
AWS secret key ID
User region
Bucket name
Frequency.

Figure 11A:
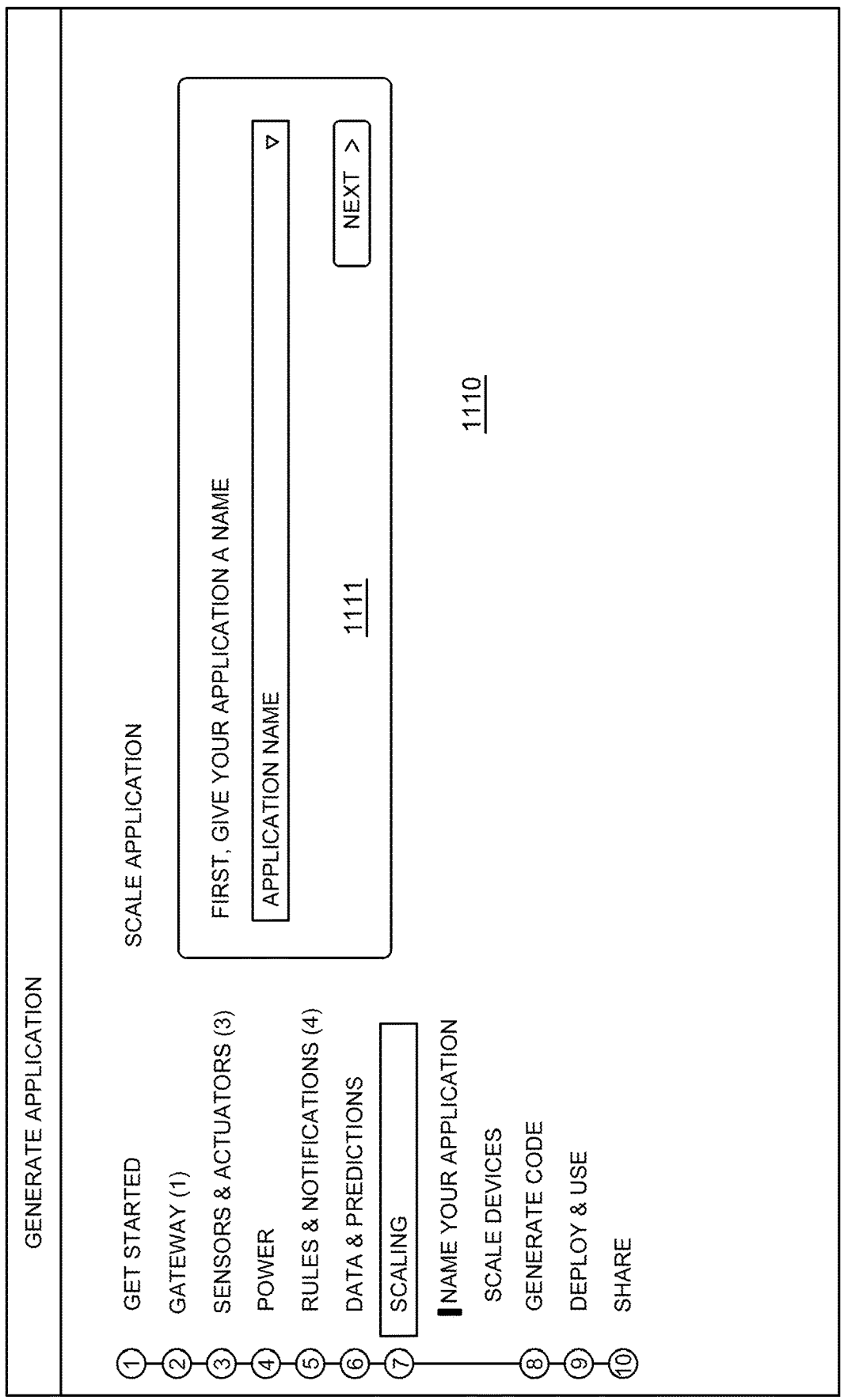
FIG. 11A depicts a graphical representation of a first portion of an optional scaling menu in accordance with an embodiment of the present principles.

In some embodiments an ACGUI in accordance with the present principles enables a user to provide information about the physical scale at which the application is being deployed to enable the system to generate code (described in greater detail below) for multiple duplicate edge and gateway devices without the user having to manually configure every device instance. FIG. 11A depicts a graphical representation of a first portion 1111 of an optional scaling menu 1110 in accordance with an embodiment of the present principles. The first portion 1111 of the optional scaling menu 1110 of the embodiment of FIG. 11A enables a user to provide a name for an application of the scaling.

In some embodiments the system maintains accounts, which contain devices and device groups. In such embodiments, another level sits between accounts and device groups/devices, where one account can contain many applications, which in turn can contain many devices and device groups, and devices groups can contain many devices. In some embodiments a hierarchy of that structure can include the following:

Account
    Application (0 . . . n)
        Device (0 . . . n)
        Device Group (0 . . . n)
            Device (1 . . . n)

For example, in some embodiments an account can have zero or more applications (i.e., a system account doesn't have to have any applications). In addition, an application can contain both devices and/or device groups and an application must have at least one device (i.e., users won't be creating empty applications). Furthermore, a device group must have at least one device, for example the gateway. In some embodiments, however, a device group will have a gateway and at least one edge device.

Figure 11B:
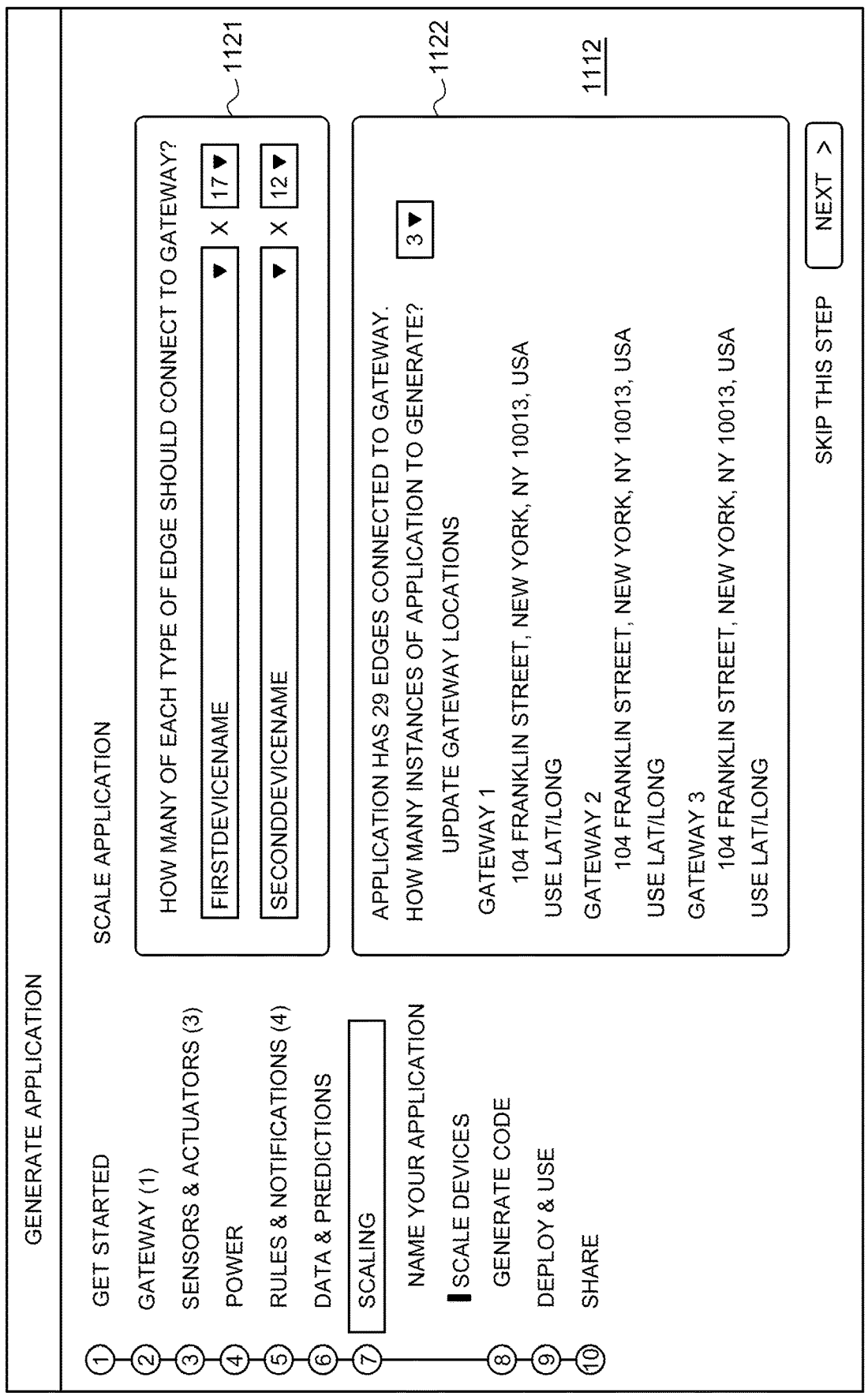
FIG. 11B depicts a graphical representation of a second portion of the scaling menu in accordance with an embodiment of the present principles.

FIG. 11B depicts a graphical representation of a second portion 1112 of the scaling menu 1110 in accordance with an embodiment of the present principles. In a first section 1121, the second portion 1112 of the scaling menu 1110 of the embodiment of FIG. 11B enables a user to specify how many of each type of edge device a user wants to have in the application. For example and as depicted in FIG. 11B, a user is able to select a device and a multiplier for defining how many of the identified device the user wants to have. For example, if the user wants to have 17 temperature sensor devices that all share an edge device hardware configuration, the user can create that edge device once in the edge configuration section (described above), and define a multiplier of 17 using the scaling menu 1110, such that a gateway will have 17 edge devices attached.

In a second section 1122 of the second portion 1112 of the scaling menu 1110 of the embodiment of FIG. 11B, a user is enabled to provide information regarding the number of instances of the application that are to be generated. For example, a user may want five (5) instances of the "one gateway+17 edges" temperature sensing system described above, which would create a total of 5 device groups for this application. In some embodiments, scaled devices inherit all properties of the device from which the scaled devices are based, including any rules that have been set. In other embodiments, an option to apply the properties to all scaled devices can be presented to the user or alternatively or in addition, an option to edit the properties of all or some of the scaled devices can be presented to the user.

In the second section 1122 of the second portion of the scaling menu 1110 of the embodiment of FIG. 11B, a user is further enabled to provide updated locations for the gateways being configured. For example, scaling can introduce issues with device naming, specifically in the case that a user are creating multiple instances of a device group. Since gateway locations are set earlier in the onboarding process, multiplying the number of gateway instances results in the creation of n number of gateways at the same location, which is likely to not map well to how the user is planning on physically deploying the devices. While these locations can be changed via the devices dashboard, the scaling menu 1110 provides a more efficient process of updating gateway locations. That is, as described above, when a user chooses to scale the number of gateway instances that are generated, the user is given the option to change the location of each gateway that is being created. The gateway locations will all be populated with the original gateway location, and each gateway can be assigned a new location (or not). If a new gateway location is set, all edges associated with that gateway can also be updated to the same location as the gateway.

Figure 11C:
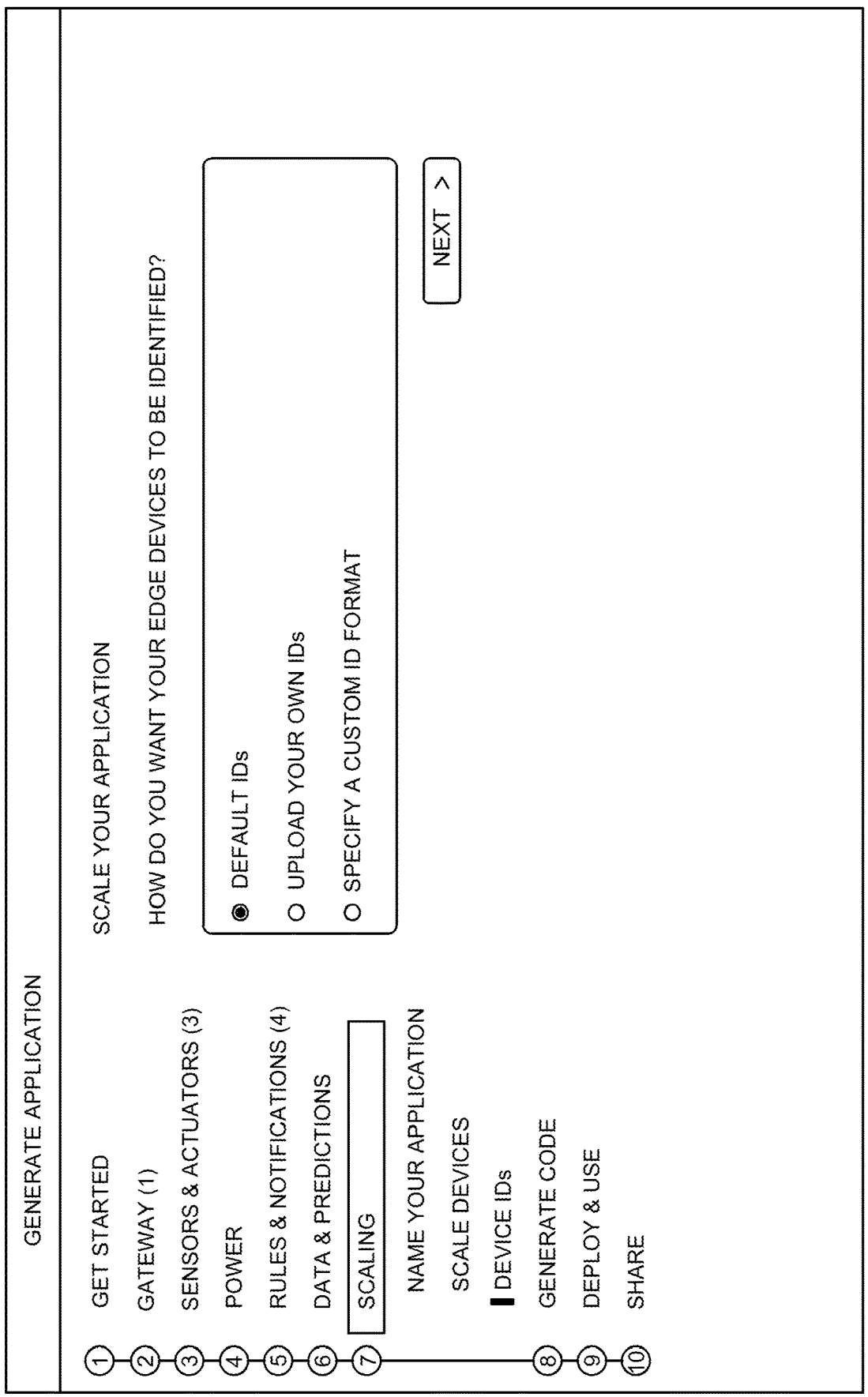
FIG. 11C depicts a graphical representation of a third portion of the scaling menu in accordance with an embodiment of the present principles.

FIG. 11C depicts a graphical representation of a third portion 1152 of the scaling menu 1110 in accordance with an embodiment of the present principles. The third portion 1152 of the scaling menu 1110 of the embodiment of FIG. 11C enables a user to specify how the edge devices should be identified. For example and as depicted in FIG. 11C, a user is able to select to have device IDs automatically generated for the edge devices, to provide a list of IDs (i.e., upload a list of IDs), or to specify an ID format and have the system automatically generate device IDs for the edge devices based on the format provided by the user.

Figure 12A:
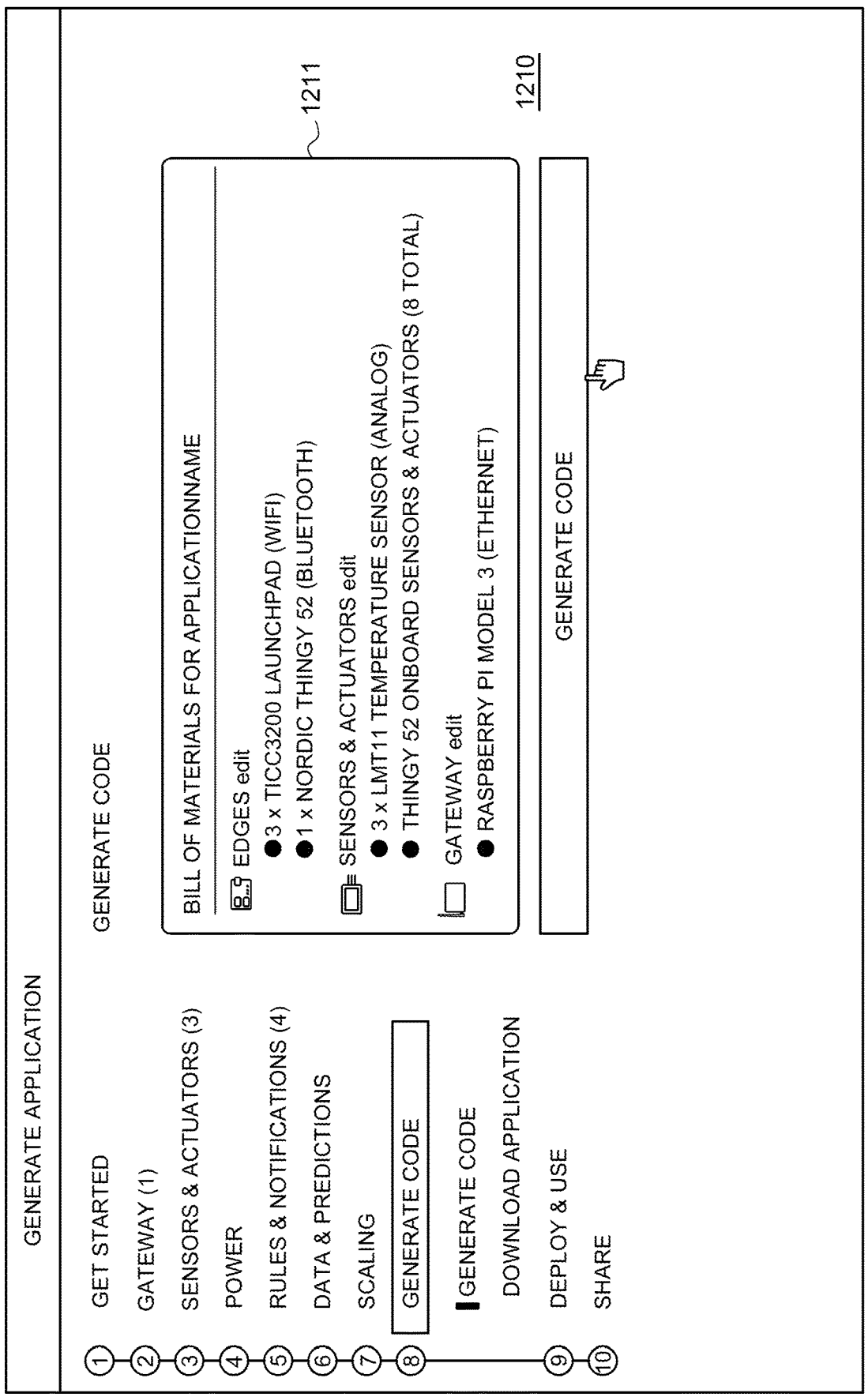
FIG. 12A depicts a graphical representation of a first portion of a code generation menu in accordance with an embodiment of the present principles.

After the menus of the ACGUI of the present principles are used by a user to provide the required provisioning information, application logic and other configuration information for devices to be configured, the system of the present principles can automatically generate code for implementing the configured devices. That is, the system generates the code that is needed to run the application from the selected gateway and edge devices. For example, FIG. 12A depicts a graphical representation of a first portion 1211 of a code generation menu 1210 in accordance with an embodiment of the present principles. The first portion 1211 of the code generation menu 1210 of the embodiment of FIG. 12A displays for a user a summary of the application's hardware configuration, and enables the user to edit a device's configuration that is not correct. Clicking the edit option in the first portion 1211 of the code generation menu 1210 of FIG. 12A enables the user to edit configuration parameters for a device. In the embodiment of the first portion 1211 of the code generation menu 1210 depicted in FIG. 12A, the summary information includes:

The application name
A listing of the edge devices
   The number and type of each edge device
   The connectivity mechanism used by each edge device
A listing of the sensors & actuators
   The number and type of each device
   The signal type for each device
A listing of the gateways
   The gateway type and internet connectivity type.

The first portion 1211 of the code generation menu 1210 depicted in FIG. 12A further includes a "Generate Code" selection button, which when selected triggers a code generation process. For example, in some embodiments in accordance with the present principles a method for automatically generating and incorporating code in a network, such as an end to end IoT network can include receiving, for example via an ACGUI, a selection of a function from a plurality of available functions for generating code automatically corresponding to the selected function, receiving at least one parameter for executing the automatically generated code to perform the function, automatically generating the code in association with the ACGUI, the automatically generated code configured to perform the function upon execution of the automatically generated code, incorporating the automatically generated code in the program for a target device, and sending the program to the target device for installation and execution on the target device. In some embodiments in accordance with the present principles, code related to devices/networks for which a user enters configuration information, application logic, technical assets e.g., setup scripts, and the like can be generated according to the teachings of commonly owned U.S. Pat. No. 10,409,562, which is incorporated by reference herein in its entirety.

Figure 12B:
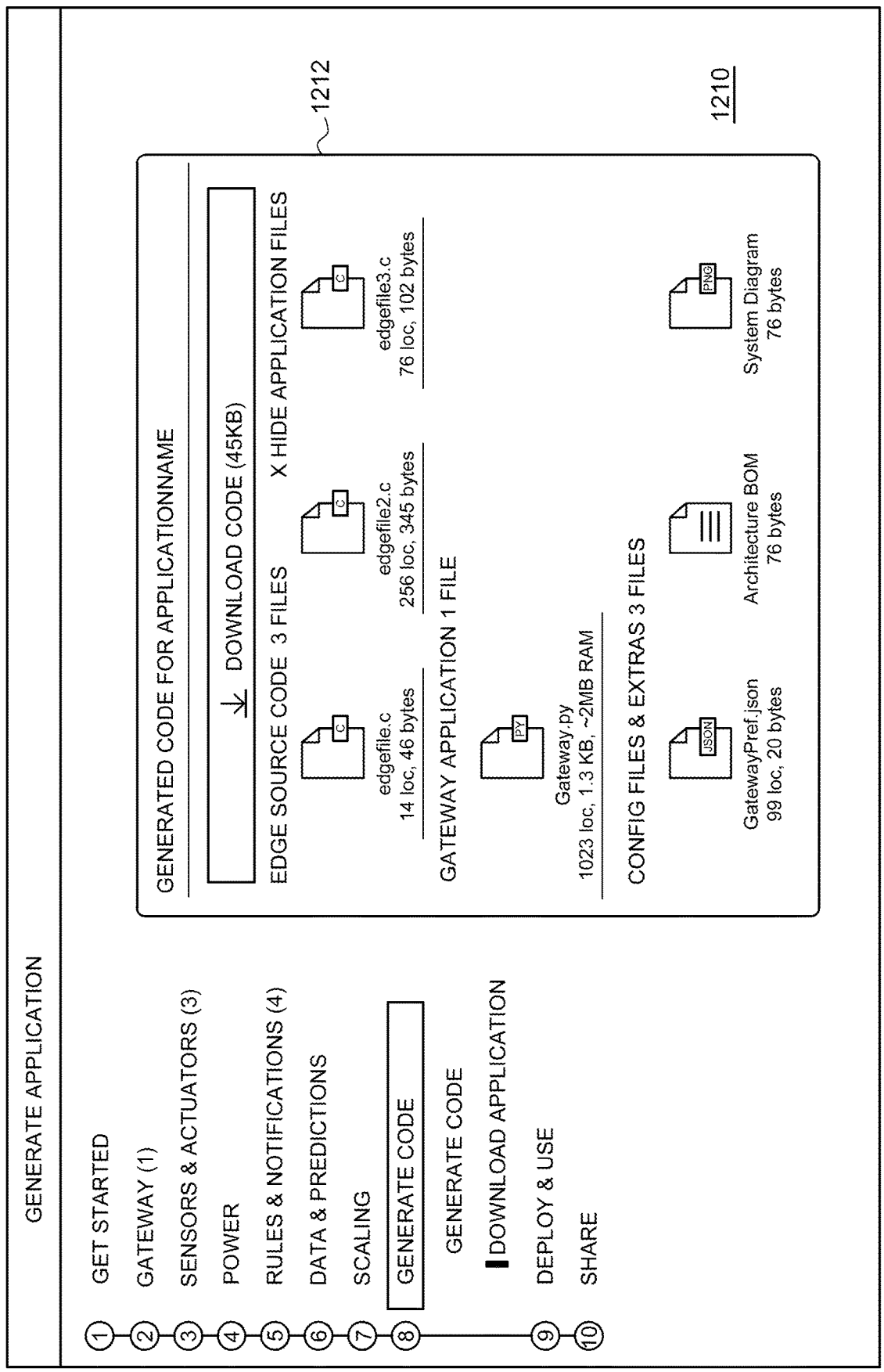
FIG. 12B depicts a graphical representation of a second portion of a code generation menu in accordance with an embodiment of the present principles.

FIG. 12B depicts a graphical representation of a second portion 1212 of a code generation menu 1210 in accordance with an embodiment of the present principles. The second portion 1212 of the code generation menu 1210 of the embodiment of FIG. 12B displays for a user a summary of the code generated. For example, in the embodiment of FIG. 12B, the second portion 1212 of the code generation menu 1210 illustratively includes:

The application name
Edge Source Code
   The number of files
   For each file:
      The file name
      The number of lines of code
      The size of the file
Gateway Application
   The number of files
   For each file:
      The file name
      The number of lines of code
      The file size
      The estimated amount of RAM that application consumes at runtime
Config Files & Extras
   The number of files
   For each file:
      The file name
      The number of lines of code (if relevant)
      The file size.

The files to be displayed in the second portion 1212 of the code generation menu 1210 for any given application can depend on both the output of the code generation process, and the provisioning information previously provided by a user during at least the onboarding flow.

In some embodiments the code generator ((e.g., code generator module described herein) is used to generate the edge application and any other technical assets e.g., setup scripts, that the user needs set up an edge device quickly. In some embodiments, during edge code generation, platform-specific features that a given MCU or development offers can be implemented. For example, if a device board like the TICC3220S(F) has onboard sensors, support can be provided for the onboard sensors, or if an MCU has support for power conservation, the generated code takes advantage of those facilities, particularly if the user is running the device off a battery.

Figure 13A:
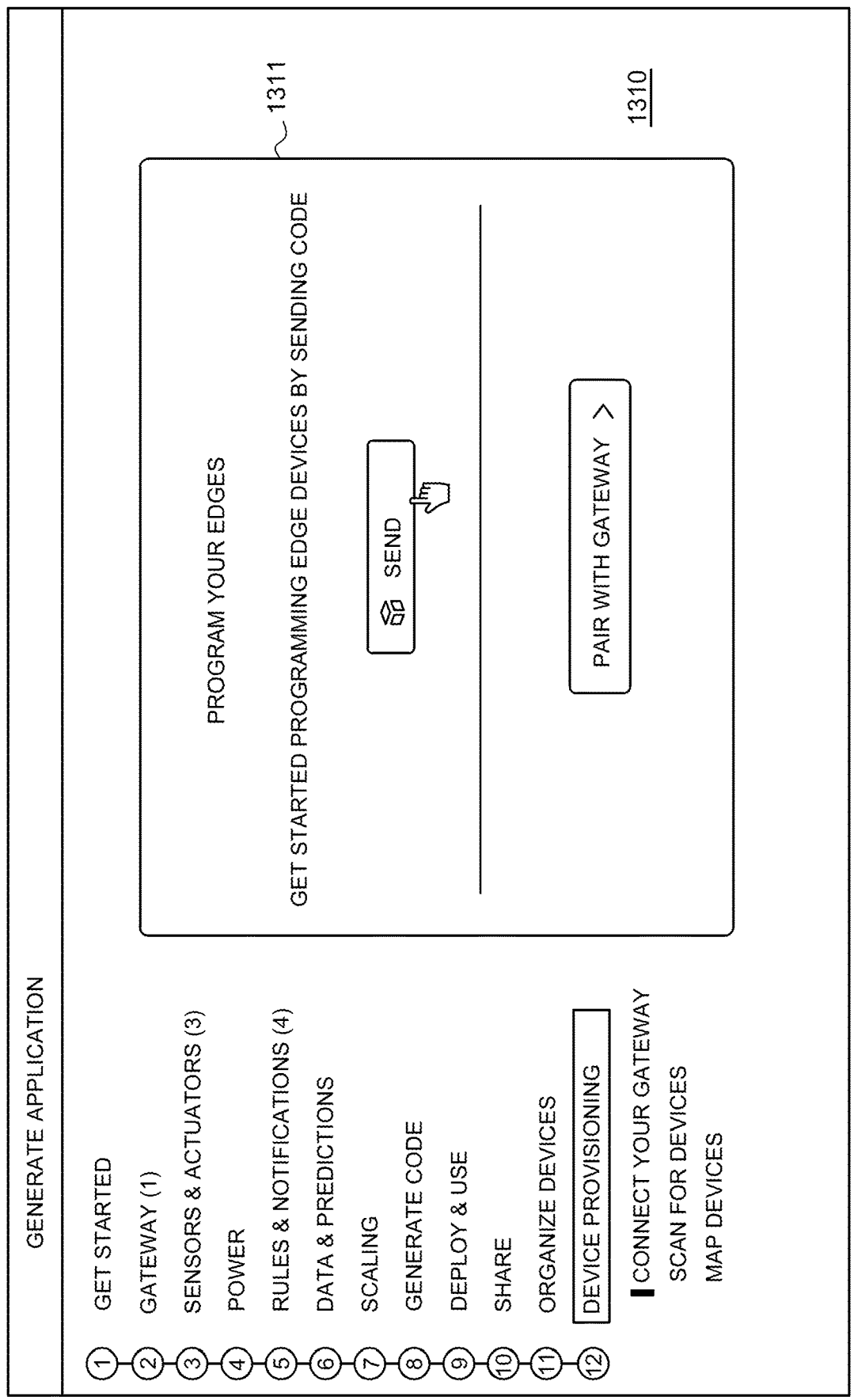
FIG. 13A depicts a graphical representation of a first portion of a deployment menu in accordance with an embodiment of the present principles.

FIG. 13A depicts a graphical representation of a first portion 1311 of a deployment menu 1310 in accordance with an embodiment of the present principles. The first portion 1311 of the deployment menu 1310 of the embodiment of FIG. 13A enables a user to deploy edge devices by communicating the code generated for the edge devices to a location(s) at which the edge devices are being deployed. Once the edge devices have been deployed, the first portion 1311 of the deployment menu 1310 of the embodiment of FIG. 13A enables a user to pair the deployed edge devices with a gateway. More specifically, in the embodiment of the first portion 1311 of the deployment menu 1310 of the embodiment of FIG. 13A, the first portion 1311 of the deployment menu 1310 provides a selectable button for the user to activate when the user is ready to pair the deployed edge devices with a gateway. Upon selection of the "Pair with Gateway" button, a second portion 1312 of the deployment menu 1310 is displayed.

Figure 13B:
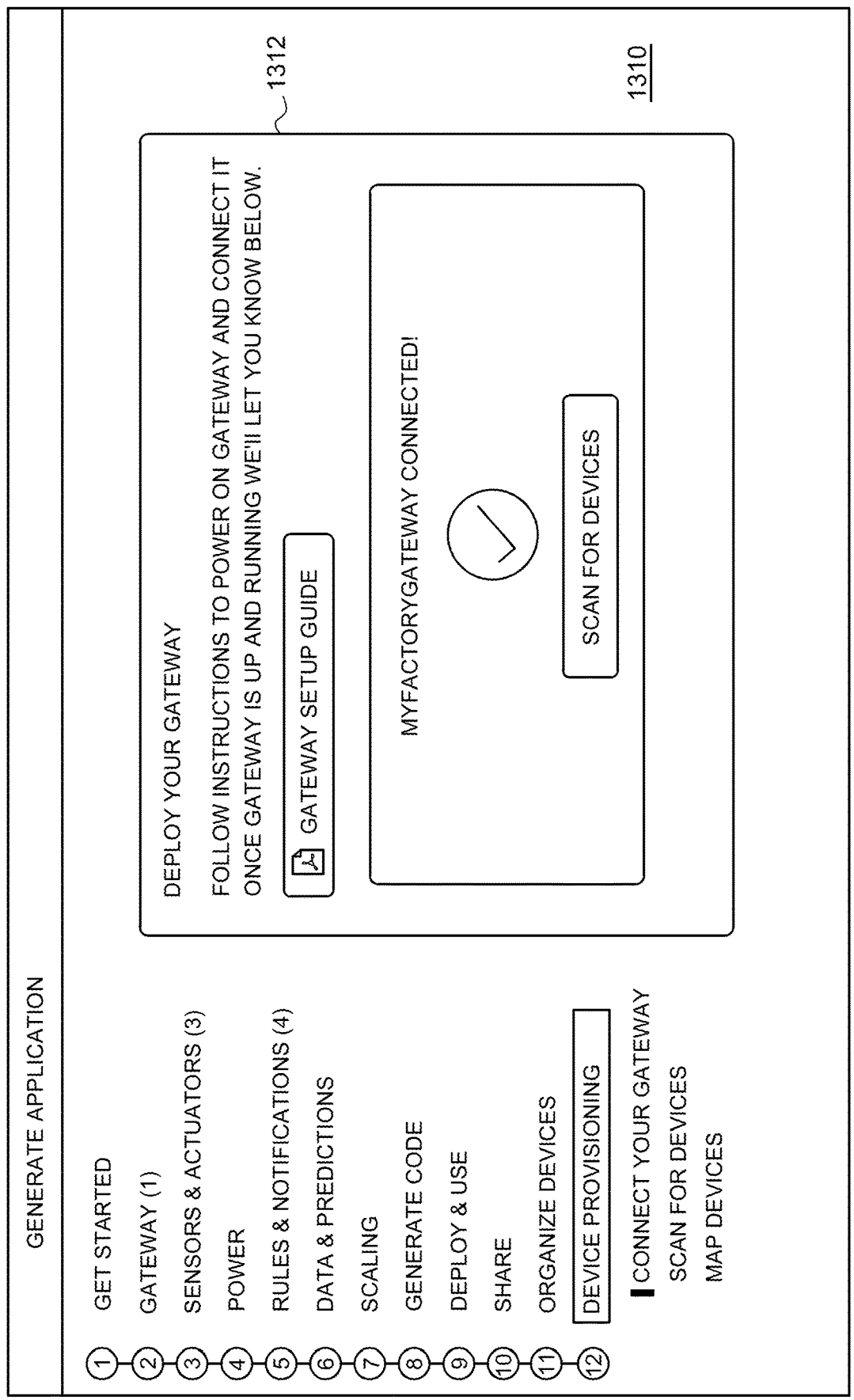
FIG. 13B depicts a graphical representation of the second portion of the deployment menu in accordance with an embodiment of the present principles.

FIG. 13B depicts a graphical representation of the second portion 1312 of the deployment menu 1310 in accordance with an embodiment of the present principles. In the embodiment of the second portion 1312 of the deployment menu 1310 of the embodiment of FIG. 13B, the second portion 1312 of the deployment menu 1310 provides a gateway setup guide to assist a user in getting a gateway up and running. Once the gateway is up and running, the user can activate a selectable button provided by the second portion 1312 of the deployment menu 1310 to cause the gateway to scan for sensor and actuator devices to which the gateway can connect.

Figure 13C:
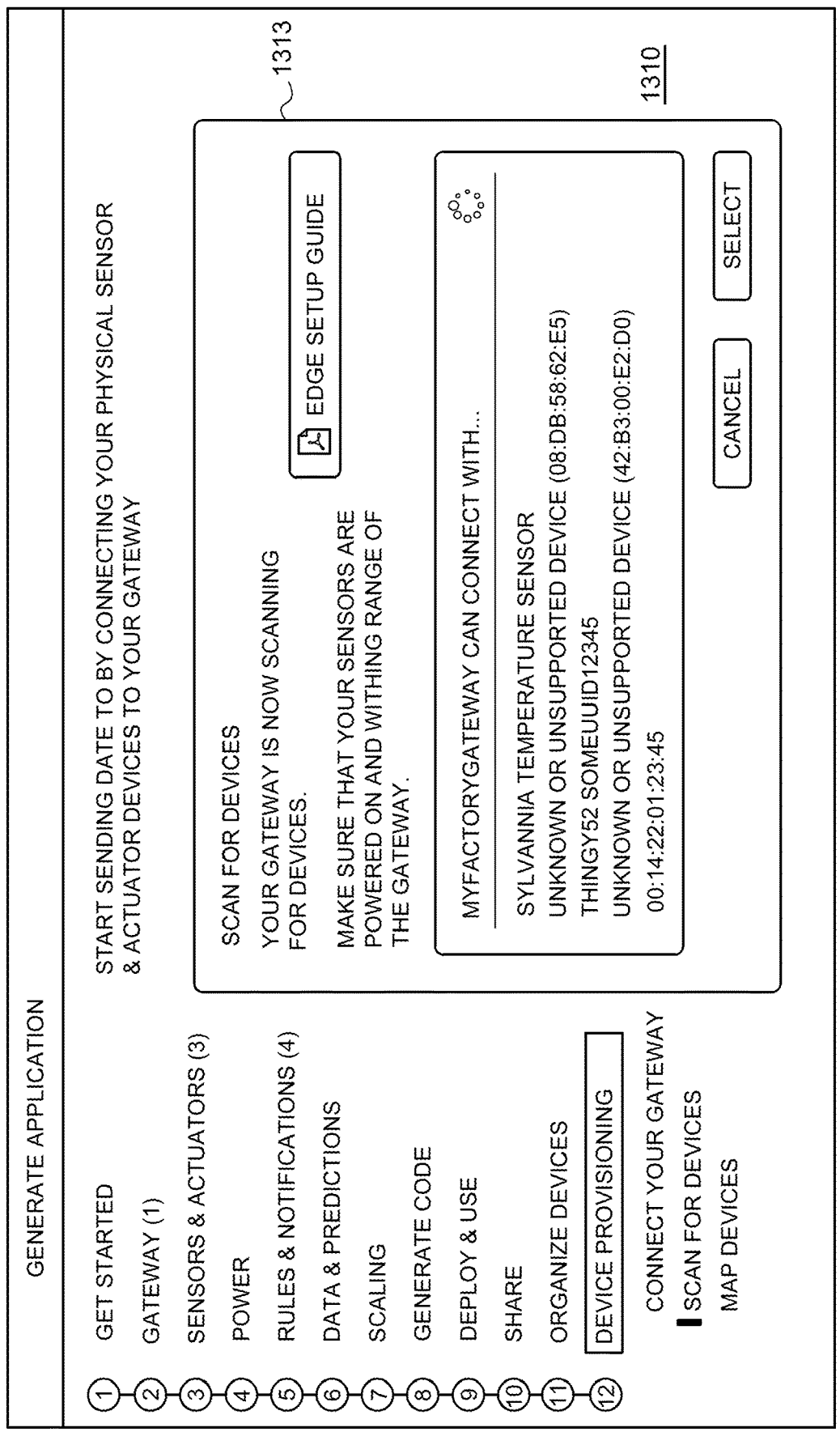
FIG. 13C depicts a graphical representation of a third portion of the deployment menu in accordance with an embodiment of the present principles.

FIG. 13C depicts a graphical representation of a third portion 1313 of the deployment menu 1310 in accordance with an embodiment of the present principles. The embodiment of the third portion 1313 of the deployment menu 1310 of the embodiment of FIG. 13C provides an edge device setup guide to assist a user in verifying that all edge devices are up and running. As depicted in FIG. 13C, the third portion 1313 of the deployment menu 1310 displays a list of sensor and actuator devices connected with the gateway, determined as a result of the scan.

Figure 14:
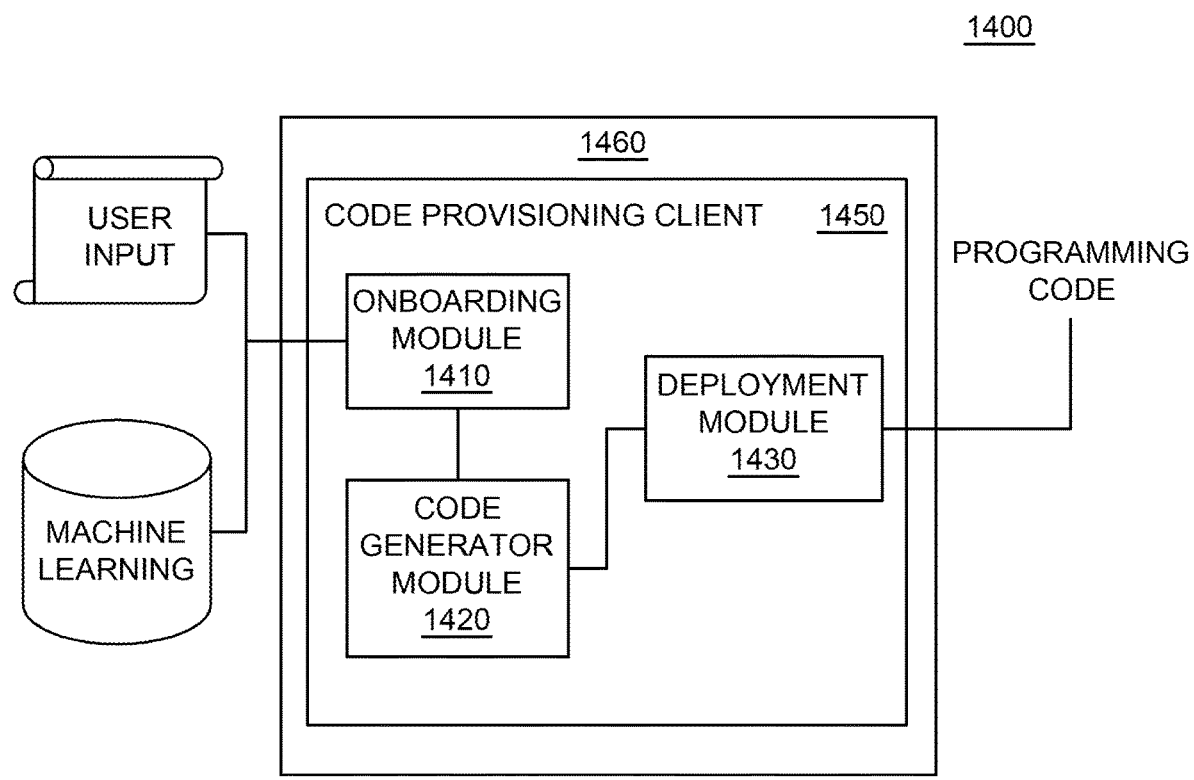
FIG. 14 depicts a high level block diagram of a code provisioning system in accordance with an embodiment of the present principles.

FIG. 14 depicts a high level block diagram of a code provisioning system 1400 in accordance with an embodiment of the present principles. The code provisioning system 1400 of FIG. 14 illustratively comprises a code provisioning client 1450 comprising a onboarding module 1410, a code generator module 1420 and a deployment module 1430.

Embodiments of a code provisioning client, such as the code provisioning client 1450 of FIG. 14, can be implemented in a computing platform 1460 (described in greater detail in FIG. 15) in accordance with the present principles. In some embodiments, the code provisioning client 1450 comprises a software client, with inputs and outputs from the computing platform 1460. In such embodiments, the code provisioning client 1450 can be implemented as a stand-alone service that is initiated by a user or software application using the computing platform 1460. Alternatively or in addition, in some embodiments, the code provisioning client 1450 can be implemented as persistence service of a system server/processor based system in which the code provisioning client 1450 can actively query the onboarding module 1410, the code generator module 1420 and the deployment module 1430 for input from a user(s) or sensors/devices. In such embodiments, the persistence service can be accomplished using a defined API (application program interface) that supports direct query.

As depicted in FIG. 14, the onboarding module 1410 of the code provisioning client 1450 receives inputs from a user or a computer regarding provisioning information of a device of a system, such as an IoT device of an IoT end to end system. For example and as described above, in some embodiments the onboarding module 1410 can provide for a user an interface, such as the ACGUI 100 of FIG. 1, to enable the user to input to the onboarding module 1410 information regarding configuration parameters of a device or devices to be configured and programmed. In some embodiments and as depicted in FIG. 14, the onboarding module 1410 can receive information regarding configuration parameters of a device or devices to be configured from a computer using, for example, machine learning to obtain the configuration parameters of the device or devices.

The provisioning/configuration information for the device or devices collected by the onboarding module 1410 can be used by the code generation module 1420 to generate code to configure the respective device(s) for which provisioning/configuration information was received. That is, in accordance with embodiments of the present principles, code is automatically generated in a language and format suitable for the type of device being provisioned/configured by the code provisioning client 1450 as described above.

The generated code can be deployed by the deployment module 1430 by, in some embodiments, sending/communicating the generated code to a respective device or devices to be implemented by the device(s) or an administrator of the device(s) for provisioning/configuring the device(s) in accordance with the generated code and as described above.

Figure 15:
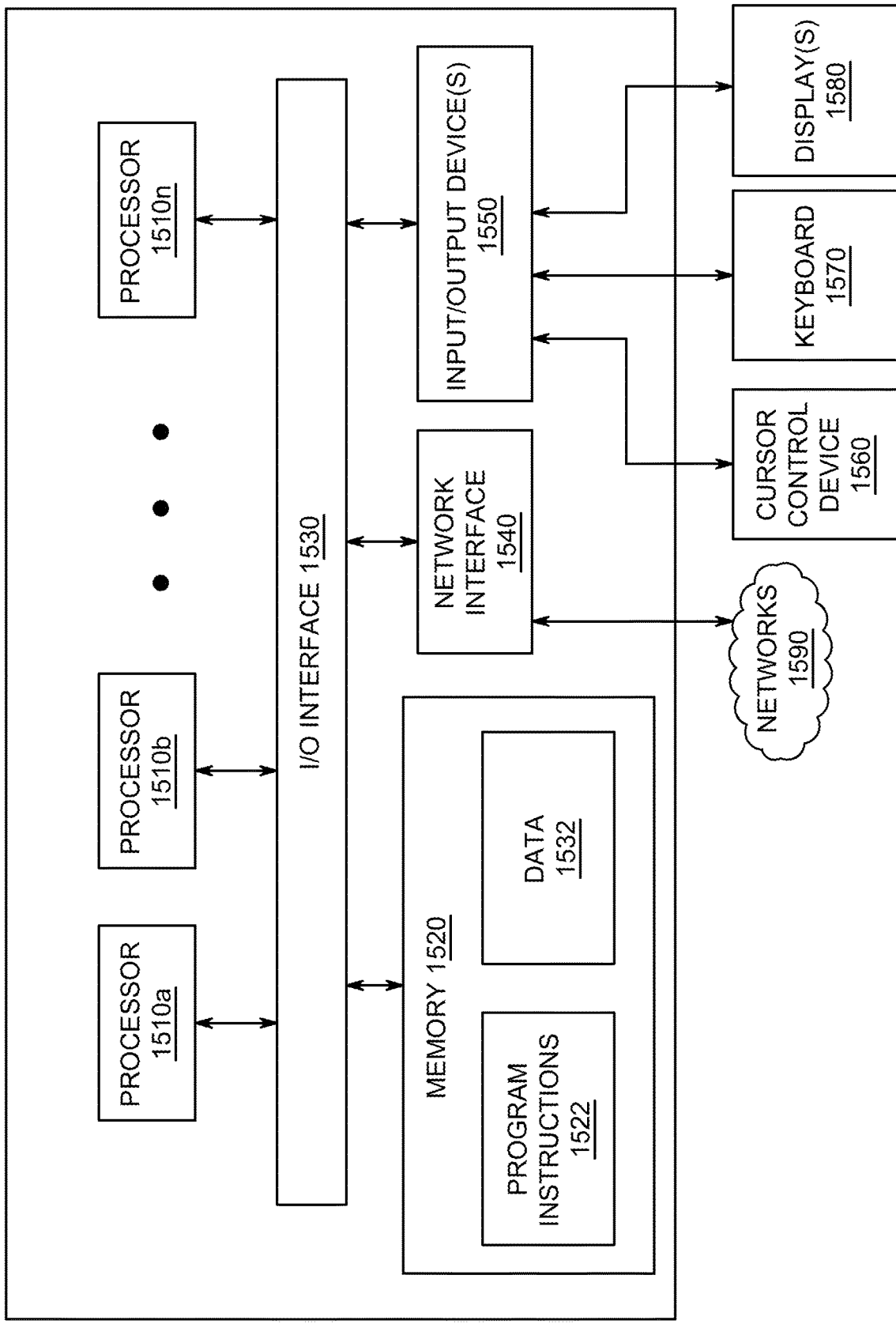
FIG. 15 depicts a high level block diagram of a computing platform suitable for use with the code provisioning system of FIG. 14.

FIG. 15 depicts a high level block diagram of a computing platform 1460 suitable for use in the code provisioning system 1400 of FIG. 14 in accordance with an embodiment of the present principles. In some embodiments computing platform 1460 can be configured to implement the methods of the present principles as processor-executable program instructions 1522 (e.g., program instructions executable by processor(s) 1510) in various embodiments.

In the embodiment of FIG. 15, the computing platform 1460 includes one or more processors 1510a-1510n coupled to a system memory 1520 via an input/output (I/O) interface 1530. The computing platform 160 further includes a network interface 1540 coupled to I/O interface 1530, and one or more input/output devices 1550, such as cursor control device 1560, keyboard 1570, and display(s) 1580. In various embodiments, any of the components can be utilized by the system to receive user input described herein. In various embodiments, a user interface can be generated and displayed on display 1580. In some cases, it is contemplated that embodiments can be implemented using a single instance of computing platform 1460, while in other embodiments multiple such systems, or multiple nodes making up computing platform 1460, can be configured to host different portions or instances of various embodiments. For example, in one embodiment some elements can be implemented via one or more nodes of computing platform 1460 that are distinct from those nodes implementing other elements. In another example, multiple nodes may implement computing platform 1460 in a distributed manner.

In different embodiments, computing platform 1460 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computing platform 1460 can be a uniprocessor system including one processor 1510, or a multiprocessor system including several processors 1510 (e.g., two, four, eight, or another suitable number). Processors 1510 can be any suitable processor capable of executing instructions. For example, in various embodiments processors 1510 may be general-purpose or embedded processors implementing any of a variety of instruction set architectures (ISAs). In multiprocessor systems, each of processors 1510 may commonly, but not necessarily, implement the same ISA.

System memory 1520 may be configured to store program instructions 1522 and/or data 1532 accessible by processor 1510. In various embodiments, system memory 1520 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described herein can be stored within system memory 1520. In other embodiments, program instructions and/or data can be received, sent or stored upon different types of computer-accessible media or on similar media separate from system memory 1520 or computing platform 1460.

In one embodiment, I/O interface 1530 can be configured to coordinate I/O traffic between processor 1510, system memory 1520, and any peripheral devices in the device, including network interface 1540 or other peripheral interfaces, such as input/output devices 1550. In some embodiments, I/O interface 1530 can perform any necessary protocol, timing or other data transformations to convert data signals from one component (e.g., system memory 1520) into a format suitable for use by another component (e.g., processor 1510). In some embodiments, I/O interface 1530 can include support for devices attached through various types of peripheral buses, such as a variant of the Peripheral Component Interconnect (PCI) bus standard or the Universal Serial Bus (USB) standard, for example. In some embodiments, the function of I/O interface 1530 can be split into two or more separate components, such as a north bridge and a south bridge, for example. Also, in some embodiments some or all of the functionality of I/O interface 1530, such as an interface to system memory 1520, can be incorporated directly into processor 1510.

Network interface 1540 can be configured to allow data to be exchanged between computing platform 1460 and other devices attached to a network (e.g., network 1590), such as one or more external systems or between nodes of computing platform 1460. In various embodiments, network 1590 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1550 can, in some embodiments, include one or more display terminals, keyboards, keypads, touchpads, scanning devices, voice or optical recognition devices, or any other devices suitable for entering or accessing data by one or more computer systems. Multiple input/output devices 1560 can be present in the computing platform 1460 or can be distributed on various nodes of the computing platform 1460. In some embodiments, similar input/output devices can be separate from the computing platform 1460 and can interact with one or more nodes of the computing platform 1460 through a wired or wireless connection, such as over network interface 1540.

In some embodiments, the illustrated computing platform 1460 can implement any of the operations and methods described herein, such as the methods illustrated by the flowcharts of FIGS. 17A and 17B (described below). In other embodiments, different elements and data can be included. Those skilled in the art will appreciate that computing platform 1460 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. Computing platform 1460 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

In some embodiments in accordance with the present principles, a user interface to enable a user to interact with at least the computing platform 1460 can be provided by at least one of the computing platform 1460 or the code provisioning client 1450. In some embodiments, the user interface can be implemented as a menu driven application presented on a display of, for example, the computing platform 1460 of the present principles, and the and one or more input/output devices of at least the computing platform 1460 can be used to provide interaction between a user the user interface and the code provisioning system 1400 of the present principles.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described herein. In some embodiments, instructions stored on a computer-accessible medium separate from computing platform 1460 can be transmitted to computing platform 1460 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 16:
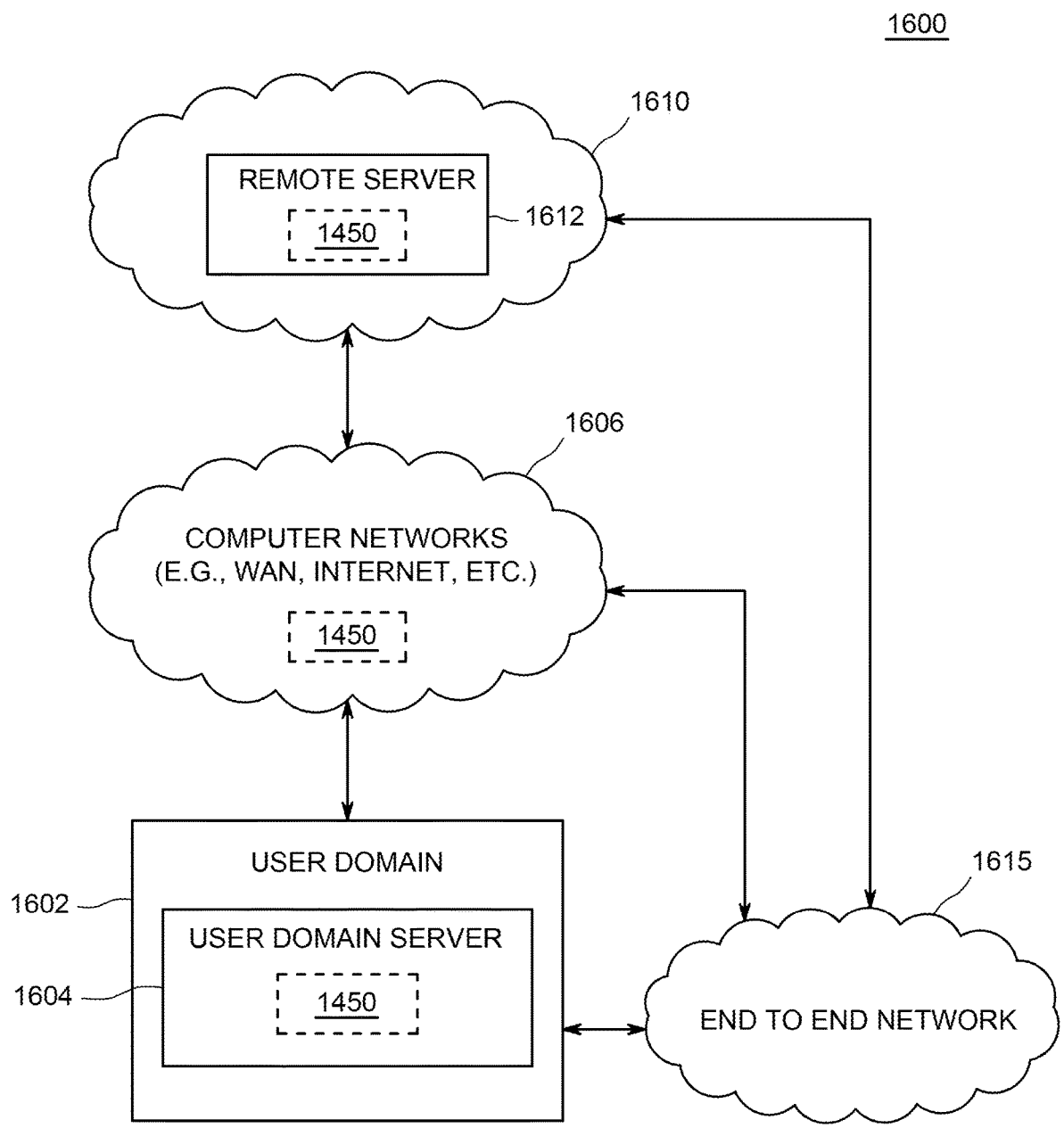
FIG. 16 depicts a high level block diagram of an end to end network in which embodiments of a code provisioning client in accordance with the present principles can be applied.

FIG. 16 depicts a high level block diagram of a network environment 1600 in which embodiments of a code provisioning client in accordance with the present principles, such as the code provisioning client 1450 of FIG. 14, can be implemented. The network environment 1600 of FIG. 16 illustratively comprises a user domain 1602 including a user domain server 1604. The network environment 1600 of FIG. 16 further comprises computer networks 1606, a remote environment, illustratively a cloud environment 1610 including a remote server, illustratively a cloud server 1612 and an end-to-end network 1615, such as an IoT end to end network. Although in FIG. 16, the remote environment is depicted as a cloud environment 1610, in some embodiments in accordance with the present principles, a remote environment in accordance with the present principles can include any other remote operating environments, such as at least one of a salesforce environment, an accounting service environment, and any other designated remote service such as a remote computing environment.

In the network environment 1600 of FIG. 16, a code provisioning client, such as the code provisioning client 1450 of FIG. 14, can be included in at least one of the user domain server 1604, the computer networks 1606 and the cloud server 1612. That is, in some embodiments, a user can use a local server (e.g., the user domain server 1604) to provide configuration information for devices of the end to end network 1615 and the code provisioning client 1450 in the user domain server 1604 can generate programming code for the respective devices and deploy the programming code to the end to end network 1615. For example in some embodiments, the code provisioning client 1450 in the user domain server 1604 can present a ACGUI, such as the ACGUI 100 of FIG. 1, to the user via a display associated with the user domain server 1604 to enable the user to provide configuration/provisioning information for at least one device of the end to end system 1615. The code provisioning client 1450 in the user domain server 1604 can then generate and deploy programming code to the end to end system 1615 for provisioning devices in accordance with the present principles.

In some embodiments, a user can implement a code provisioning client 1450 in the computer networks 1606 to provide configuration information for devices of the end to end network 1615 over, for example the internet, and the code provisioning client 1450 in the computer networks

1606 can generate programming code for the respective devices and deploy the programming code to the end to end network 1615 in accordance with the present principles. Alternatively or in addition, in some embodiments, a code provisioning client 1450 in the cloud server 1612 of the cloud environment 1610 can be implemented to generate programming code for the respective devices and deploy the programming code to the end to end network 1615 in accordance with the present principles. For example, in some embodiments it can be advantageous to perform processing function for assembling data and generating and deploying code in the cloud environment 1610 to take advantage of the processing capabilities of the cloud environment 1610. In some embodiments in accordance with the present principles, a code provisioning client 1450 can be located in a single or multiple locations/servers/computers to perform all or portions of the herein described functionalities of a code provisioning client 1450 in accordance with the present principles.

Figure 20:
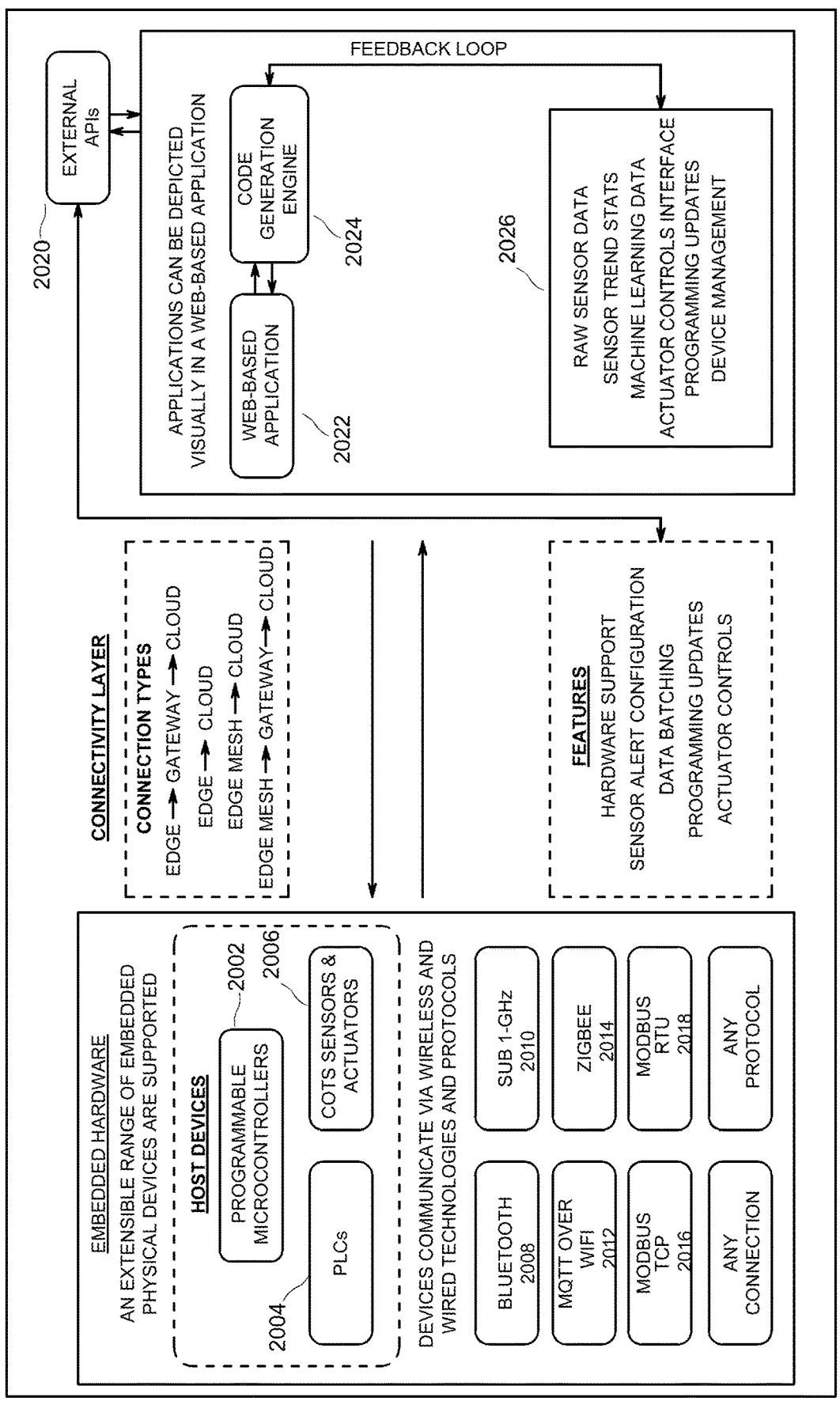
FIG. 20 depicts a high level functional diagram of a code provisioning system in accordance with an embodiment of the present principles.

FIG. 20 depicts a high level functional diagram of an architecture of a code provisioning system, such as the code provisioning system 1400 of FIG. 14, in accordance with an embodiment of the present principles. As depicted in the functional architecture of the code provisioning system depicted in FIG. 20, in some embodiments a code provisioning system in accordance with the present principles can be deployed in embedded devices of an end to end system, which include, but are not limited to at least one of Programmable Microcontrollers 2002, PLCs 2004, and commercial off the shelf (COTS) sensors and actuators 2006. As depicted in FIG. 20, devices of an end to end system can be configured by a code provisioning system in accordance with the present principles to communicate via communication protocols which include but are not limited to at least one of Bluetooth 2008, Sub 1-GHz 2010, MQTT over WiFi 2012, Zigbee 2014, Modbus TCP 2016, Modbus RTU 2018, and substantially any other connections and protocols.

As depicted in the functional architecture of the code provisioning system depicted in FIG. 20, in some embodiments connections able to be provisioned using a code provisioning system in accordance with the present principles can include but are not limited to at least one of Edge to Gateway to Cloud, Edge to Cloud, Edge mesh to Cloud and Edge mesh to Gateway to Cloud.

As further depicted in the functional architecture of the code provisioning system depicted in FIG. 20, in some embodiments some features supported can include but are not limited to at least one of Hardware support, Sensor alert configuration, Data batching, Programming updates, and Actuator controls.

As depicted in the functional architecture of the code provisioning system depicted in FIG. 20, in some embodiments external APIs 2020 can be implemented to deploy a code provisioning system in accordance with the present principles using a web-based application 2022. In some embodiments a web-based application 2022 can be implemented by the onboarding module 1410 of the code provisioning system 1400 depicted in FIG. 14. The web-based application 2022 can communicate with a code generation engine 2024, such as the code generation module 1420 of the code provisioning system 1400 depicted in FIG. 14, to generate programming code as described herein.

As further depicted in the functional architecture of the code provisioning system depicted in FIG. 20, in some embodiments the code generation engine 2024 can be in communication with an external storage 2026 for receiving information including but not limited to at least one of Raw sensor data, Sensor trend statistics, Machine learning data, Actuator controls interface data, Programming update data, and Device management data.

Figure 17A:
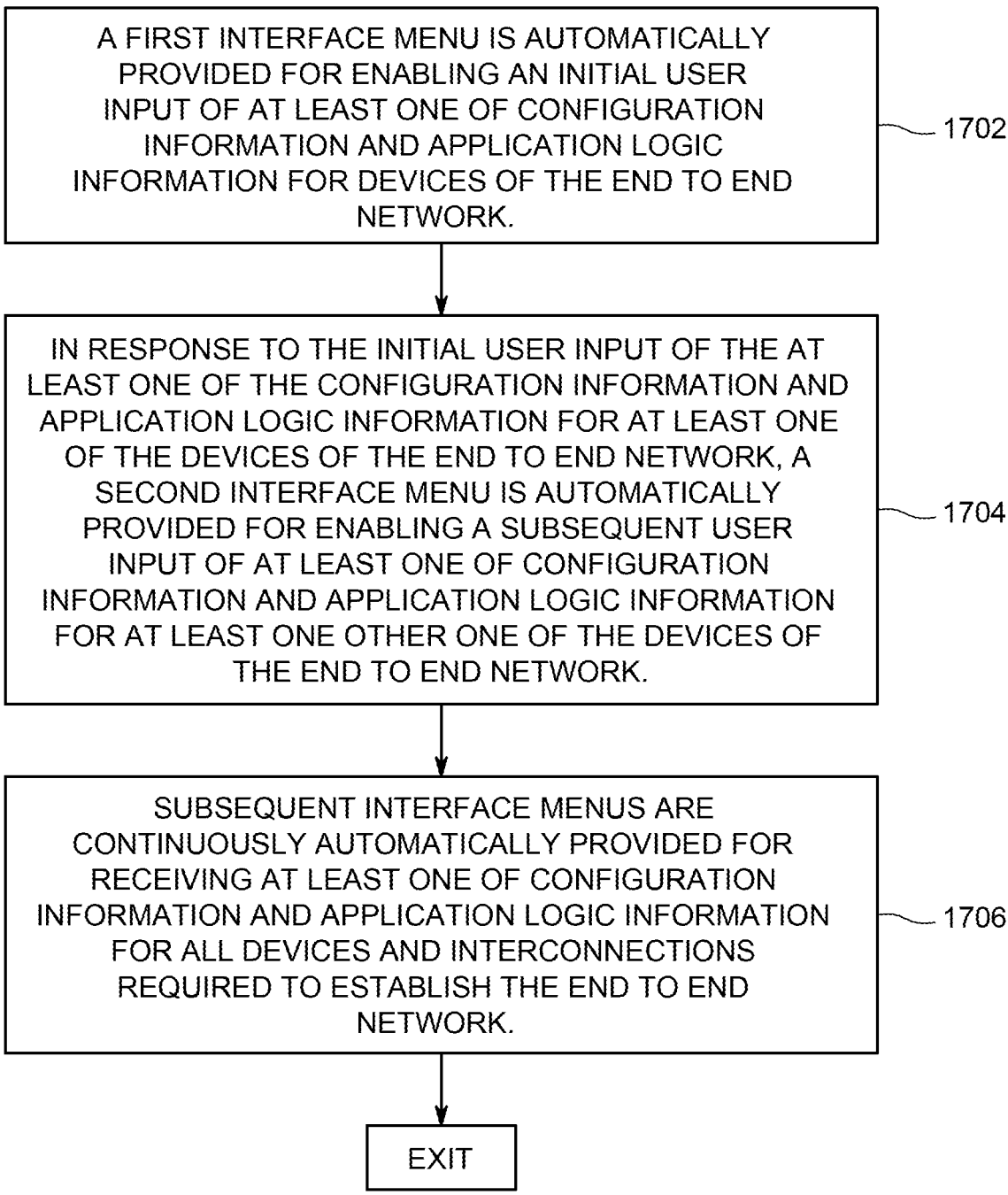
FIG. 17A depicts a flow diagram of a method for assisted code provisioning of an end to end network in accordance with an embodiment of the present principles.

FIG. 17A depicts a flow diagram of a method 1700 for assisted code provisioning of an end to end network in accordance with an embodiment of the present principles. The method 1700 begins at 1702 during which a first interface menu is automatically provided for enabling an initial user input of at least one of configuration information and application logic information for devices of the end to end network. The method 1700 can proceed to 1704.

At 1704, in response to the initial user input of the at least one of the configuration information and application logic information for at least one of the devices of the end to end network, a second interface menu is automatically provided for enabling a subsequent user input of at least one of configuration information and application logic information for at least one other one of the devices of the end to end network. The method 1700 can proceed to 1706.

At 1706, subsequent interface menus are continuously automatically provided for receiving at least one of configuration information and application logic information for all devices and interconnections required to establish the end to end network. The method 1700 can be exited.

In the method 1700 of FIG. 17A, a subsequent interface menu provided for input can be dependent upon an input made to a previous interface menu, and an order of interface menus automatically provided guides a user through a provisioning of the end to end network without the need to enter programming code.

The method 1700 can further include automatically generating programming code from the input configuration information and application logic information for each of the devices required to establish the end to end network and deploying the generated programming code by sending the generated programming code to respective ones of each of the devices for configuring the devices to establish the end to end network.

Figure 17B:
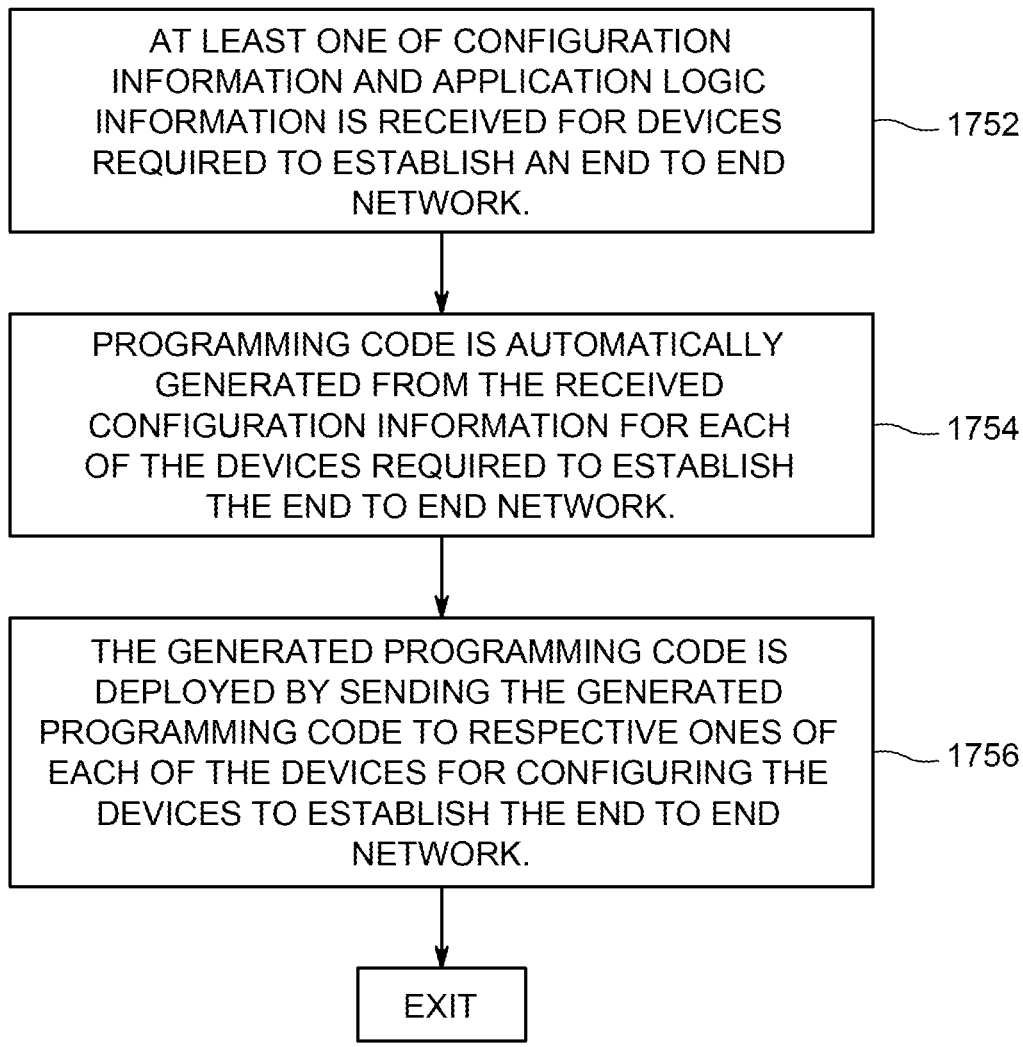
FIG. 17B depicts a flow diagram of a method for assisted code provisioning of an end to end network in accordance with an alternate embodiment of the present principles.

FIG. 17B depicts a flow diagram of a method 1750 for assisted code provisioning of an end to end network in accordance with an alternate embodiment of the present principles. The method 1750 begins at 1752 during which configuration information is received for devices required to establish the end to end network. The method 1750 can proceed to 1754.

At 1754, programming code is automatically generated from the received configuration information for each of the devices required to establish the end to end network. The method 1750 can proceed to 1756.

At 1756, the generated programming code is deployed by communicating the generated programming code to respective ones of each of the devices for configuring the devices to establish the end to end network. The method 1750 can be exited.

In some embodiments, the method 1750 can further include providing an interface to a user for inputting configuration information for devices required to establish the end to end network.

The methods described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing platform or a "virtual machine" running on one or more computing platforms). For example, a machine-readable medium can include any suitable form of volatile or non-volatile memory.

In addition, the various operations, processes, and methods disclosed herein can be embodied in a machine-readable medium and/or a machine accessible medium/storage device compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium/storage device.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for assisted provisioning of an end to end network, comprising:
  in response to a user request, providing a first interface menu for enabling an initial user input of at least one of configuration information and application logic information, which defines workflow logic, for the end to end network;
  in response to the user completing the input of the at least one of the configuration information and application logic information for the end to end network, automatically providing a second interface menu for enabling a subsequent user input of at least one of configuration information and application logic information, which defines workflow logic for applications, for at least one device of the end to end network;
  continuing to automatically provide subsequent interface menus for receiving at least one of configuration information and application logic information for all devices and interconnections required to establish the end to end network;
  wherein a subsequent interface menu provided for input can be dependent upon an input made to a previously provided interface menu, and an order of interface menus automatically provided guides a user through a logically ordered provisioning of the end to end network without the need to enter programming code;
  automatically generating programming code from the input at least one of configuration information and application logic information for each of the devices required to establish the end to end network;
  analyzing operating data of at least one of the devices of the end to end network; and
  predicting a future behavior of the at least one of the devices of the end to end network using the analyzed data.

2. The method of claim 1, further comprising: deploying the generated programming code by sending the generated programming code to respective ones of each of the devices for configuring the devices to establish the end to end network.

3. The method of claim 1, further comprising:
  analyzing operating data of the end to end network; and
  predicting a future behavior of the end to end network using the analyzed data.

4. The method of claim 1, further comprising:
at least one of monitoring and analyzing operating data of the devices of the end to end network; and
reprogramming at least one of the devices of the end to end network based on the at least one of the monitored and analyzed data.

5. The method of claim 1, wherein operating data of the end to end network is made available for at least one of download, visual display and sending to another system.

6. The method of claim 1, further comprising:
providing a scaling function such that the at least one of the configuration information and application logic information does not have to be input for duplicate ones of the at least one of the devices of the end to end network.

7. The method of claim 1, wherein the at least one of the configuration information and application logic information is further determined using data analysis methods including at least one of machine learning, linear regression analysis and neural networks.

8. A method for assisted code provisioning of an end to end network, comprising:
receiving at least one of configuration information and application logic information, which defines workflow logic for applications, for devices required to establish the end to end network determined using data analysis methods including at least one of machine learning, linear regression analysis and neural networks;
automatically generating programming code from the received configuration information for each of the devices required to establish the end to end network;
deploying the generated programming code by communicating the generated programming code to respective ones of each of the devices for configuring the devices to establish the end to end network; and
providing an interface to a user for inputting supplemental configuration information and application logic information for each of the devices required to establish the end to end network.

9. The method of claim 8, further comprising:
providing an interface to a user for inputting supplemental configuration information and application logic information for each of the devices required to establish the end to end network.

10. The method of claim 8, further comprising:
analyzing operating data of at least one of the devices of the end to end network; and
predicting a future behavior of the at least one of the devices of the end to end network using the analyzed data.

11. The method of claim 8, further comprising:
analyzing operating data of the end to end network; and
predicting a future behavior of the end to end network using the analyzed data.

12. The method of claim 8, further comprising:
at least one of monitoring and analyzing operating data of the devices of the end to end network; and
reprogramming at least one of the devices of the end to end network based on the at least one of the monitored and analyzed data.

13. The method of claim 8, wherein operating data of the end to end network is made available for download.

14. The method of claim 8, further comprising:
providing a scaling function such that the at least one of the configuration information and application logic information does not have to be input for duplicate ones of the at least one of the devices of the end to end network.

15. A non-transitory machine-readable medium having stored thereon at least one program, the at least one program including instructions which, when executed by a processor, cause the processor to perform a method in a processor based system for assisted code provisioning of an end to end network, comprising:
in response to a user request, providing a first interface menu for enabling an initial user input of at least one of configuration information and application logic information, which defines workflow logic, for the end to end network;
in response to the user completing the input of the at least one of the configuration information and application logic information for the end to end network, automatically providing a second interface menu for enabling a subsequent user input of at least one of configuration information and application logic information, which defines workflow logic for applications, for at least one device of the end to end network;
continuing to automatically provide subsequent interface menus for receiving at least one of configuration information and application logic information for all devices and interconnections required to establish the end to end network;
wherein a subsequent interface menu provided for input can be dependent upon an input made to a previously provided interface menu, and an order of interface menus automatically provided guides a user through a logically ordered provisioning of the end to end network without the need to enter programming code;
automatically generating programming code from the input at least one of configuration information and application logic information for each of the devices required to establish the end to end network; and
deploying the generated programming code by sending the generated programming code to respective ones of each of the devices for configuring the devices to establish the end to end network.

16. The method of the non-transitory machine-readable medium of claim 15, further comprising:
analyzing operating data of at least one of the devices of the end to end network; and
predicting a future behavior of the at least one of the devices of the end to end network using the analyzed data.

17. The method of the non-transitory machine-readable medium of claim 15, further comprising:
at least one of monitoring and analyzing operating data of the devices of the end to end network; and
reprogramming at least one of the devices of the end to end network based on the at least one of the monitored and analyzed data.

18. The method of the non-transitory machine-readable medium of claim 15, wherein operating data of the end to end network is made available for download.

19. The method of the non-transitory machine-readable medium of claim 15, further comprising:
providing a scaling function such that the at least one of the configuration information and application logic information does not have to be input for duplicate ones of the at least one of the devices of the end to end network.

20. The method of the non-transitory machine-readable medium of claim 15, wherein the at least one of the configuration information and application logic information is further determined using at least one of machine learning, linear regression analysis and neural networks.

21. A non-transitory machine-readable medium having stored thereon at least one program, the at least one program including instructions which, when executed by a processor, cause the processor to perform a method in a processor based system for assisted code provisioning of an end to end network, comprising:
receiving at least one of configuration information and application logic information, which defines workflow logic for applications, for devices required to establish the end to end network determined using data analysis methods including at least one of machine learning, linear regression analysis and neural networks;
automatically generating programming code from the received at least one of configuration information and application logic information for each of the devices required to establish the end to end network;
deploying the generated programming code by communicating the generated programming code to respective ones of each of the devices for configuring the devices to establish the end to end network; and
providing an interface for receiving input of supplemental configuration information and application logic information for each of the devices required to establish the end to end network.

22. An apparatus for assisted provisioning of an end to end network, comprising:
a processor; and
a memory coupled to the processor, the memory having stored therein at least one of programs or instructions executable by the processor to configure the apparatus to:
automatically provide a first interface menu for enabling an initial user input of at least one of configuration information and application logic information, which defines workflow logic, for the end to end network;
in response to the user completing the input of the at least one of the configuration information and application logic information for the end to end network, automatically provide a second interface menu for enabling a subsequent user input of at least one of configuration information and application logic information, which defines workflow logic for applications, for at least one of the devices of the end to end network;
continue to automatically provide subsequent interface menus for receiving at least one of configuration information and application logic information for all devices and interconnections required to establish the end to end network;
automatically generate programming code from the received at least one of the configuration information and application logic information for each of the devices required to establish the end to end network; and
deploy the generated programming code by sending the generated programming code to respective ones of each of the devices for configuring the devices to establish the end to end network;
wherein a subsequent interface menu provided for input can be dependent upon an input made to a previously provided interface menu and an order of interface menus automatically provided guides a user through logically ordered provisioning of each of the devices of the end to end network.

23. The apparatus of claim 22, wherein the apparatus is further configured to:
analyze operating data of at least one of the devices of the end to end network; and
predict a future behavior of the at least one of the devices of the end to end network using the analyzed data.

24. The apparatus of claim 22, wherein the apparatus is further configured to:
at least one of monitor and analyze operating data of the devices of the end to end network; and
reprogram at least one of the devices of the end to end network based on the at least one of the monitored and analyzed data.

25. The apparatus of claim 22, wherein the apparatus is further configured to:
provide a scaling function such that the at least one of the configuration information and application logic information does not have to be input for duplicate ones of the at least one of the devices of the end to end network.

26. The apparatus of claim 22, wherein the apparatus is further configured to:
generate a graphical user interface for enabling a user to input the at least one of the configuration information and the application logic information for the devices required to establish the end to end network.

27. The apparatus of claim 22, wherein the end to end network comprises an internet-of-things (IoT) end to end network and at least some of the devices comprise IoT devices.

28. The apparatus of claim 22, wherein the devices of the end to end network comprise multiple architecture options, connectivity options, scaling options and programming languages and the code generator module generates respective code for each of the devices in accordance with how each of the devices is provisioned.

* * * * *